(12) United States Patent
Kang et al.

(10) Patent No.: US 10,185,177 B2
(45) Date of Patent: Jan. 22, 2019

(54) BACKLIGHT UNIT AND DISPLAY DEVICE INCLUDING THE SAME

(71) Applicant: LG ELECTRONICS INC., Seoul (KR)

(72) Inventors: Bohee Kang, Seoul (KR); Sohee An, Seoul (KR); Jinsin Park, Seoul (KR); Jongyoung Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 15/417,906

(22) Filed: Jan. 27, 2017

(65) Prior Publication Data

US 2017/0219882 A1    Aug. 3, 2017

(30) Foreign Application Priority Data

Jan. 28, 2016    (KR) .................. 10-2016-0010921

(51) Int. Cl.
  *G09F 13/04*    (2006.01)
  *G02F 1/1335*    (2006.01)

(52) U.S. Cl.
  CPC .. *G02F 1/133605* (2013.01); *G02F 1/133603* (2013.01); *G02F 1/133608* (2013.01); *G02F 1/133611* (2013.01)

(58) Field of Classification Search
  CPC ......... G02F 1/133605; G02F 1/133608; G02F 1/133611; G02F 1/133603
  See application file for complete search history.

(56) References Cited

U.S. PATENT DOCUMENTS

| 2007/0019419 | A1* | 1/2007 | Hafuka | ............. G02F 1/133603 362/373 |
| 2012/0287347 | A1 | 11/2012 | Matsumoto | |
| 2014/0313424 | A1* | 10/2014 | Imajo | .................. G02B 6/0011 348/790 |

FOREIGN PATENT DOCUMENTS

| EP | 3 015 912 A1 | 5/2016 |
| EP | 3 015 914 A1 | 5/2016 |

\* cited by examiner

*Primary Examiner* — Evan Dzierzynski
(74) *Attorney, Agent, or Firm* — Birch, Stewart, Kolasch & Birch, LLP

(57) ABSTRACT

A backlight unit and a display device including the same are disclosed. The backlight unit includes a frame including a bottom area and a sidewall area extended from the bottom area, at least one substrate positioned at a front surface of the frame, a plurality of light sources being mounted on the at least one substrate, a reflective sheet positioned at a front surface of the at least one substrate, and an optical sheet positioned at a front surface of the reflective sheet. The reflective sheet includes a first sheet area contacting the bottom area and including a plurality of lens holes, and a second sheet area spaced apart from the bottom area and including a dot area. The dot area includes a first dot area and a second dot area spaced apart from the first dot area.

17 Claims, 40 Drawing Sheets

(a)

(b)

(a)

(b)

(c)

(a)

(b)

(a)

(b)

(a)

(b)

BACKLIGHT UNIT AND DISPLAY DEVICE INCLUDING THE SAME

This application claims the benefit of Korean Patent Application No. 10-2016-0010921 filed on Jan. 28, 2016, the entire contents of which are incorporated herein by reference for all purposes as if fully set forth herein.

BACKGROUND OF THE INVENTION

Field of the Invention

The present disclosure relates to a backlight unit and a display device including the backlight unit.

Discussion of the Related Art

With the development of the information society, various demands for display devices are increasing. Various display devices, such as liquid crystal displays (LCDs), plasma display panels (PDPs), electroluminescent displays (ELDs), and vacuum fluorescent displays (VFDs), have been recently studied and used in response to various demands for the display devices.

Among the display devices, a liquid crystal display panel of a liquid crystal display includes a liquid crystal layer and a thin film transistor (TFT) substrate and a color filter substrate that are positioned opposite each other with the liquid crystal layer interposed therebetween. The liquid crystal display panel displays an image using light provided by a backlight unit.

SUMMARY OF THE INVENTION

In one aspect, there is provided a backlight unit including a frame including a bottom area and a sidewall area extended from the bottom area; at least one substrate positioned at a front surface of the frame, a plurality of light sources being mounted on the at least one substrate; a reflective sheet positioned at a front surface of the at least one substrate; and an optical sheet positioned at a front surface of the reflective sheet, wherein the reflective sheet includes a first sheet area contacting the bottom area of the frame and including a plurality of lens holes, and a second sheet area spaced apart from the bottom area of the frame and including a dot area, and wherein the dot area includes a first dot area and a second dot area spaced apart from the first dot area.

The second dot area may be disposed along a side of the reflective sheet, and the first dot area may be disposed between the second dot area and the plurality of lens holes.

The first dot area may be disposed corresponding to an outermost lens hole of the plurality of lens holes.

The dot area may include a horizontal dot area disposed along a long side of the reflective sheet and a vertical dot area disposed along a short side of the reflective sheet. An outermost lens hole of the plurality of lens holes may be disposed closer to the vertical dot area than the horizontal dot area.

The horizontal dot area may include the first dot area and the second dot area.

The reflective sheet may further include at least one of a cut portion between the horizontal dot area and the vertical dot area and a folded portion extended from the cut portion.

The first dot area may include a plurality of first dot areas corresponding to a plurality of outermost lens holes of the plurality of lens holes. An attribute of a dot included in at least one of the plurality of first dot areas may be different from an attribute of a dot included in at least another of the plurality of first dot areas.

The second dot area may include a plurality of areas, and dots included in the plurality of areas of the second dot area may have different attributes depending on a distance between the lens hole and the second dot area.

A plurality of dots constituting the dot area may be an uneven portion formed in at least a portion of the reflective sheet.

A size of at least one of a plurality of dots constituting the dot area may be different from a size of at least another of the plurality of dots.

A first distance between two dots of a plurality of dots constituting the dot area may be different from a second distance between two other dots of the plurality of dots.

The second sheet area may be present between the bottom area and the sidewall area of the frame. As the second sheet area becomes close to the sidewall area from the bottom area, an angle between the second sheet area and the bottom area of the frame may increase.

The reflective sheet may further include a third sheet area extended from the second sheet area and contacting the sidewall area of the frame.

The backlight unit may further include at least one guide panel coupled to the sidewall area of the frame. The third sheet area may be positioned between the frame and the at least one guide panel.

At least one of a density, a size, a shape, and a color of a dot included in a portion of the dot area may be different from at least one of a density, a size, a shape, and a color of a dot included in another portion of the dot area depending on a location between the dot area and the plurality of lens holes.

In another aspect, there is provided a display device including a frame including a bottom area and a sidewall area extended from the bottom area; at least one substrate on which a plurality of light sources is mounted; a reflective sheet positioned at a front surface of the at least one substrate; an optical sheet positioned at a front surface of the reflective sheet; and a display panel positioned at a front surface of the optical sheet, wherein the reflective sheet includes a first sheet area contacting the bottom area of the frame and including a plurality of lens holes, and a second sheet area spaced apart from the bottom area of the frame and including a dot area, and wherein the dot area includes a first dot area and a second dot area spaced apart from the first dot area.

The second dot area may be disposed along a side of the reflective sheet, and the first dot area may be disposed between the second dot area and the plurality of lens holes.

The first dot area may be disposed corresponding to an outermost lens hole of the plurality of lens holes.

The dot area may include a horizontal dot area disposed along a long side of the reflective sheet and a vertical dot area disposed along a short side of the reflective sheet. An outermost lens hole of the plurality of lens holes may be disposed closer to the vertical dot area than the horizontal dot area.

The first dot area may include a plurality of first dot areas corresponding to a plurality of outermost lens holes of the plurality of lens holes. An attribute of a dot included in at least one of the plurality of first dot areas may be different from an attribute of a dot included in at least another of the plurality of first dot areas.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
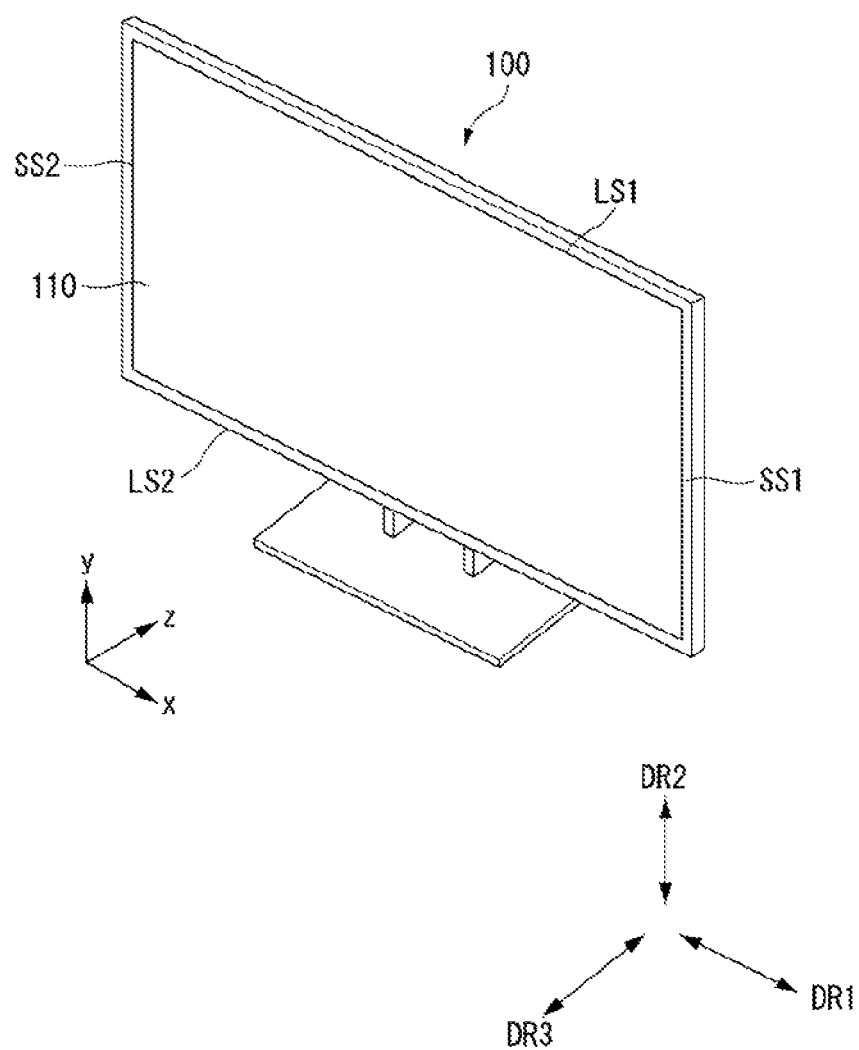
FIGS. 1 and 2 illustrate a display device according to an embodiment of the invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following embodiments of the invention are provided to those skilled in the art in order to describe the present invention more completely. Accordingly, shapes and sizes of elements shown in the drawings may be exaggerated for clarity.

Hereinafter, embodiments of the invention are described using a liquid crystal display panel as an example of a display panel. Other display panels may be used. For example, a plasma display panel (PDP), a field emission display (FED) panel, and an organic light emitting diode (OLED) display panel may be used.

In what follows, a display panel may include a first long side LS1, a second long side LS2 opposite the first long side LS1, a first short side SS1 adjacent to the first long side LS1 and the second long side LS2, and a second short side SS2 opposite the first short side SS1.

In embodiments disclosed herein, the first short side SS1 may be referred to as a first side area; the second short side SS2 may be referred to as a second side area opposite the first side area; the first long side LS1 may be referred to as a third side area that is adjacent to the first side area and the second side area and is positioned between the first side area and the second side area; and the second long side LS2 may be referred to as a fourth side area that is adjacent to the first side area and the second side area, is positioned between the first side area and the second side area, and is opposite to the third side area.

Embodiments of the invention describe and illustrate that lengths of the first and second long sides LS1 and LS2 are longer than lengths of the first and second short sides SS1 and SS2 for the convenience of explanation. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display panel, and a second direction DR2 may be a direction parallel to the short sides SS1 and SS2 of the display panel.

Further, a third direction DR3 may be a direction vertical to the first direction DR1 and/or the second direction DR2.

In the following description, the first direction DR1 and the second direction DR2 may be commonly referred to as a horizontal direction.

Further, the third direction DR3 may be referred to as a vertical direction.

Figure 2:
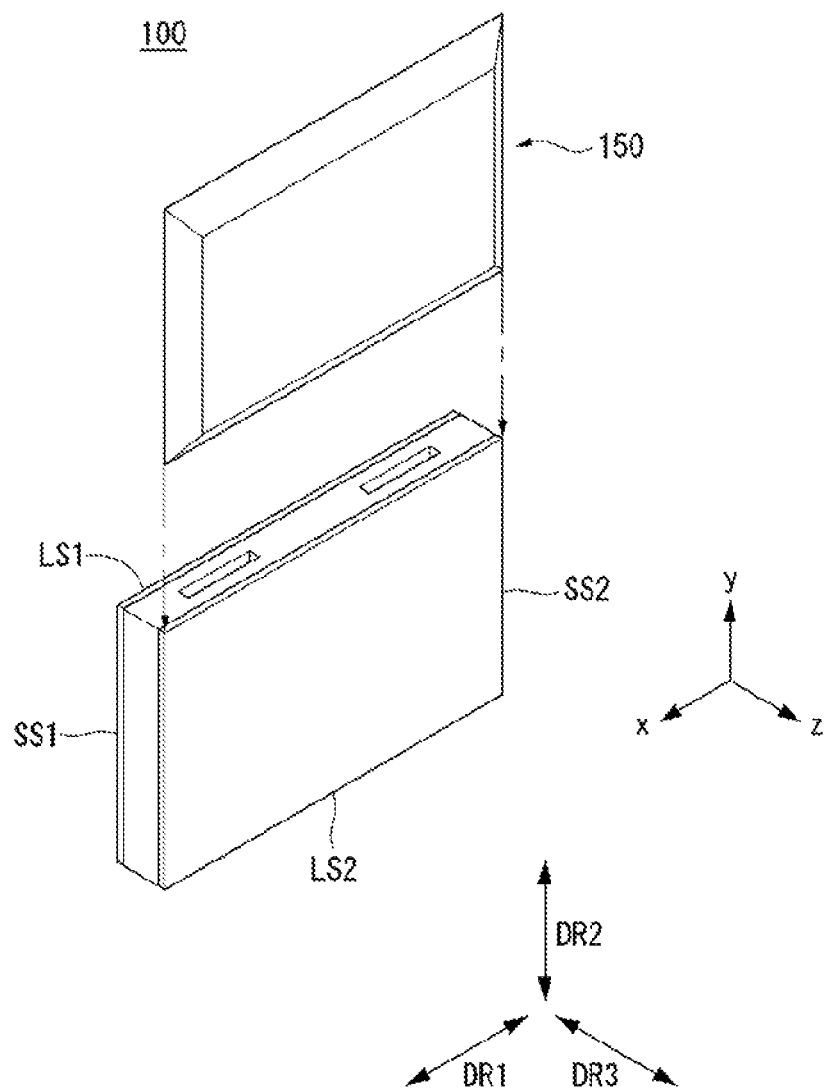

FIGS. 1 and 2 illustrate a display device according to an embodiment of the invention.

As shown in FIGS. 1 and 2, a display device 100 according to an embodiment of the invention may include a display panel 110 and a back cover 150 positioned in the rear of the display panel 110.

The back cover 150 may be connected to the display panel 110 in a sliding manner in a direction (i.e., the second direction DR2) from the first long side LS1 to the second long side LS2. In other words, the back cover 150 may be inserted into the first short side SS1, the second short side SS2 opposite the first short side SS1, and the first long side LS1 that is adjacent to the first and second short sides SS1 and SS2 and is positioned between the first short side SS1 and the second short side SS2, in the display panel 110 in the sliding manner.

The back cover 150 and/or other components adjacent to the back cover 150 may include a protrusion, a sliding portion, a coupling portion, etc., so that the back cover 150 is coupled to the display panel 110 in the sliding manner.

FIGS. 3 to 7 illustrate configuration of the display device related to the embodiment of the invention.

Figure 3:
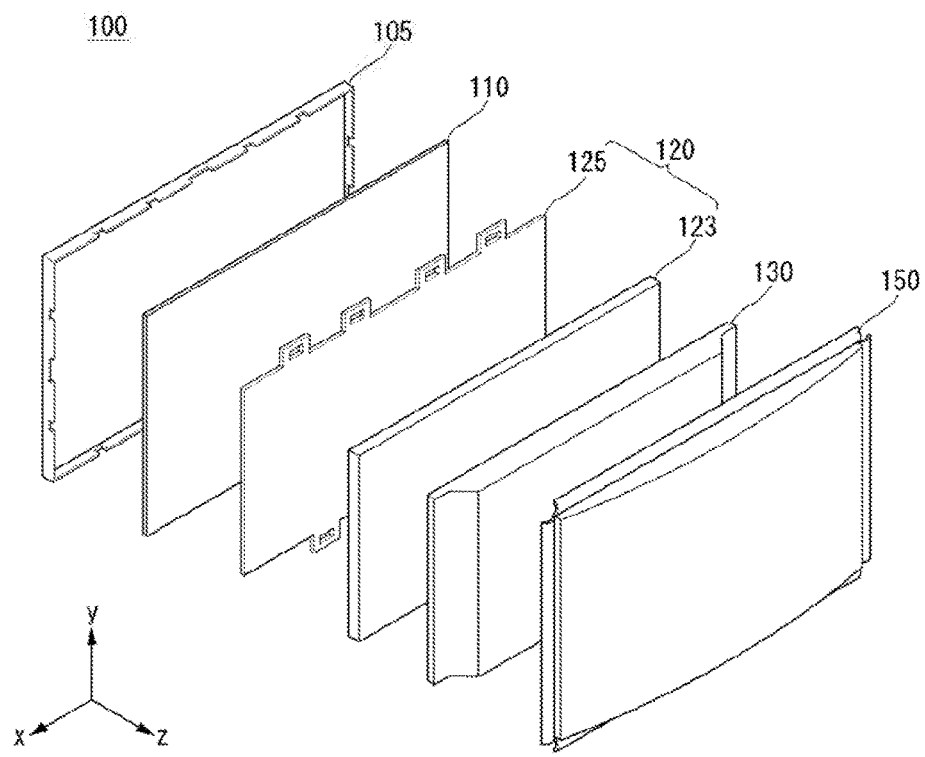
FIGS. 3 to 7 illustrate configuration of a display device related to an embodiment of the invention.

As shown in FIG. 3, the display device 100 according to the embodiment of the invention may include a front cover 105, the display panel 110, a backlight unit 120, a frame 130, and the back cover 150.

The front cover 105 may cover at least a portion of a front surface and a side surface of the display panel 110. The front cover 105 may have a rectangular fame shape, in which a center portion is empty. Because the center portion of the front cover 105 is empty, an image displayed on the display panel 110 may be seen to the outside.

The front cover 105 may include a front cover and a side cover. Namely, the front cover 105 may include the front cover at the front surface of the display panel 110 and the side cover at the side surface of the display panel 110. The front cover and the side cover may be separately configured. One of the front cover and the side cover may be omitted. For example, the front cover may be omitted, and only the side cover may be absent in terms of a beautiful appearance of the display device 100.

The display panel 110 may be positioned in front of the display device 100 and may display an image. The display panel 110 may divide the image into a plurality of pixels and may output the image while controlling color, brightness, and chroma of each pixel. The display panel 110 may include an active area, on which the image is displayed, and an inactive area, on which the image is not displayed. The display panel 110 may include a front substrate and a back substrate that are positioned opposite each other with a liquid crystal layer interposed therebetween.

The front substrate may include a plurality of pixels each including red, green, and blue subpixels. The front substrate may generate an image corresponding to red, green, or blue color in response to a control signal.

The back substrate may include switching elements. The back substrate may turn on pixel electrodes. For example, the pixel electrodes may change a molecule arrangement of the liquid crystal layer in response to a control signal received from the outside. The liquid crystal layer may include a plurality of liquid crystal molecules. The arrangement of the liquid crystal molecules may be changed depending on a voltage difference between the pixel electrode and a common electrode. The liquid crystal layer may transmit light provided by the backlight unit 120 to the front substrate.

The backlight unit 120 may be positioned at a back surface of the display panel 110. The backlight unit 120 may include a plurality of light sources. The light sources of the backlight unit 120 may be arranged in an edge type or a direct type. In case of the edge type backlight unit 120, a light guide plate may be added.

The backlight unit 120 may be coupled to a front surface of the frame 130. For example, the plurality of light sources may be disposed at the front surface of the frame 130. In this instance, the backlight unit 120 may be commonly called the direct type backlight unit 120.

The backlight unit 120 may be driven in an entire driving method or a partial driving method, such as a local dimming method and an impulsive driving method. The backlight unit 120 may include an optical sheet 125 and an optical layer 123.

The optical sheet 125 can cause light of the light sources to be uniformly transferred to the display panel 110. The optical sheet 125 may include a plurality of layers. For example, the optical sheet 125 may include at least one prism sheet and/or at least one diffusion sheet.

The optical sheet 125 may further include at least one coupling portion 125d. The coupling portion 125d may be coupled to the front cover 105 and/or the back cover 150. Namely, the coupling portion 125d may be directly coupled to the front cover 105 and/or the back cover 150. Alternatively, the coupling portion 125d may be coupled to a structure formed at the front cover 105 and/or the back cover 150. Namely, the coupling portion 125d may be indirectly coupled to the front cover 105 and/or the back cover 150.

The optical layer 123 may include the light source, etc. The detailed configuration of the optical layer 123 will be described in the corresponding paragraphs.

The frame 130 may support components constituting the display device 100. For example, the frame 130 may be coupled to the backlight unit 120. The frame 130 may be formed of a metal material, for example, an aluminum alloy.

The back cover 150 may be positioned at a back surface of the display device 100. The back cover 150 may protect inner configuration of the display device 100 from the outside. At least a portion of the back cover 150 may be coupled to the frame 130 and/or the front cover 105. The back cover 150 may be an injection production (or injection molded) formed of a resin material.

Figure 4:
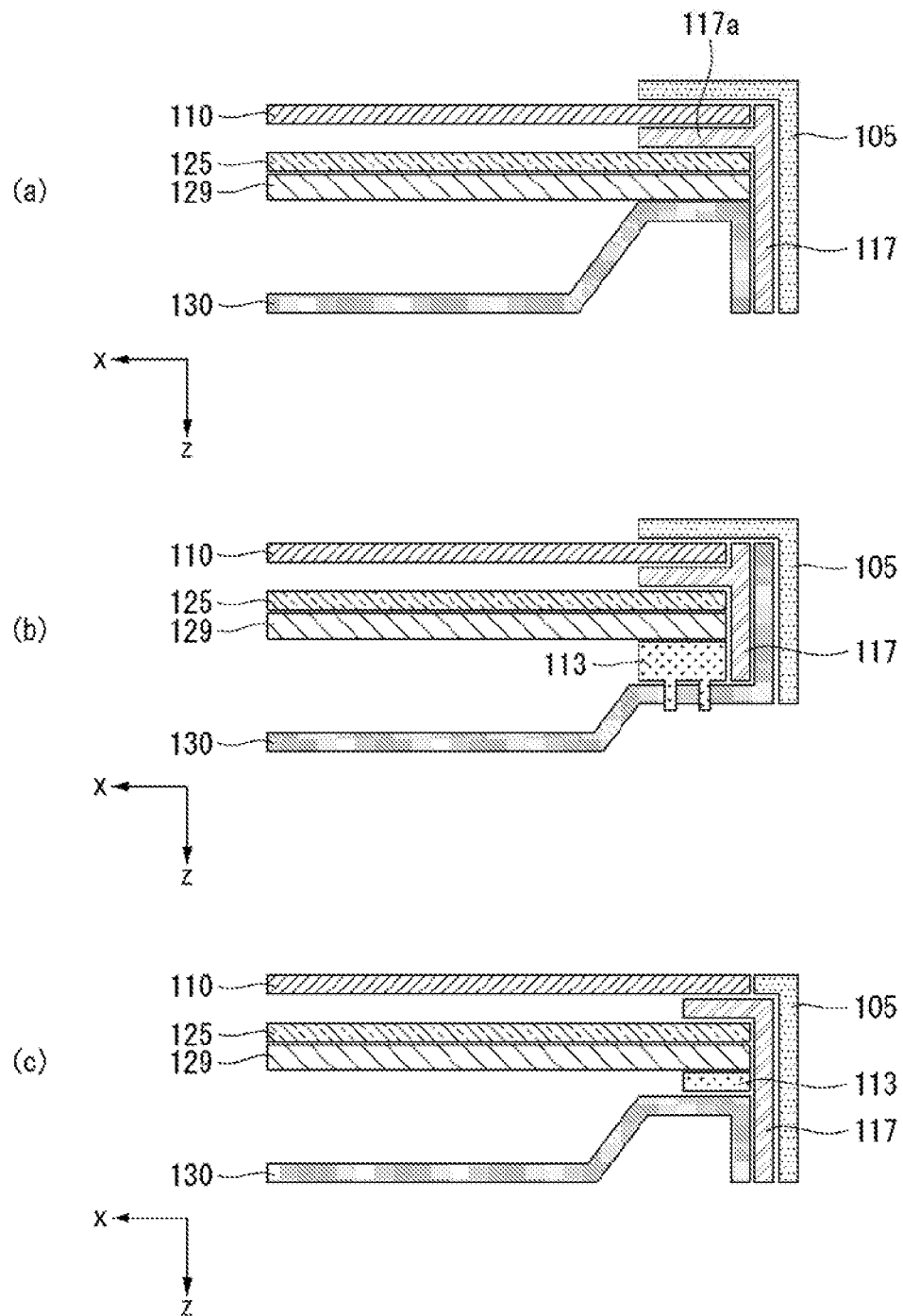

FIG. 4 illustrates configuration of the optical sheet 125.

As shown in (a) of FIG. 4, the optical sheet 125 and/or a diffusion plate 129 may be positioned on the frame 130. The optical sheet 125 and/or the diffusion plate 129 may be coupled to the frame 130 at an edge of the frame 130. The optical sheet 125 and/or the diffusion plate 129 may be directly placed at the edge of the frame 130. Namely, an outer perimeter of the optical sheet 125 and/or the diffusion plate 129 may be supported by the frame 130. An upper surface of an edge of the optical sheet 125 and/or the diffusion plate 129 may be surrounded by a first guide panel 117. For example, the optical sheet 125 and/or the diffusion plate 129 may be positioned between the edge of the frame 130 and a flange 117a of the first guide panel 117.

The display panel 110 may be positioned at a front surface of the optical sheet 125. An edge of the display panel 110 may be coupled to the first guide panel 117. Namely, the display panel 110 may be supported by the first guide panel 117.

An edge area of the front surface of the display panel 110 may be surrounded by the front cover 105. For example, the display panel 110 may be positioned between the first guide panel 117 and the front cover 105.

As shown in (b) of FIG. 4, the display device 100 according to the embodiment of the invention may further include a second guide panel 113. The optical sheet 125 and/or the diffusion plate 129 may be coupled to the second guide panel 113. Namely, the second guide panel 113 may have a shape, in which the second guide panel 113 is coupled to the frame 130, and the optical sheet 125 and/or the diffusion plate 129 are/is coupled to the second guide panel 113. The second guide panel 113 may be formed of a material different from the frame 130. The frame 130 may have a shape surrounding the first and second guide panels 117 and 113.

As shown in (c) of FIG. 4, in the display device 100 according to the embodiment of the invention, the front cover 105 may not cover the front surface of the display panel 110. Namely, one end of the front cover 105 may be positioned on the side of the display panel 110.

Figure 5:
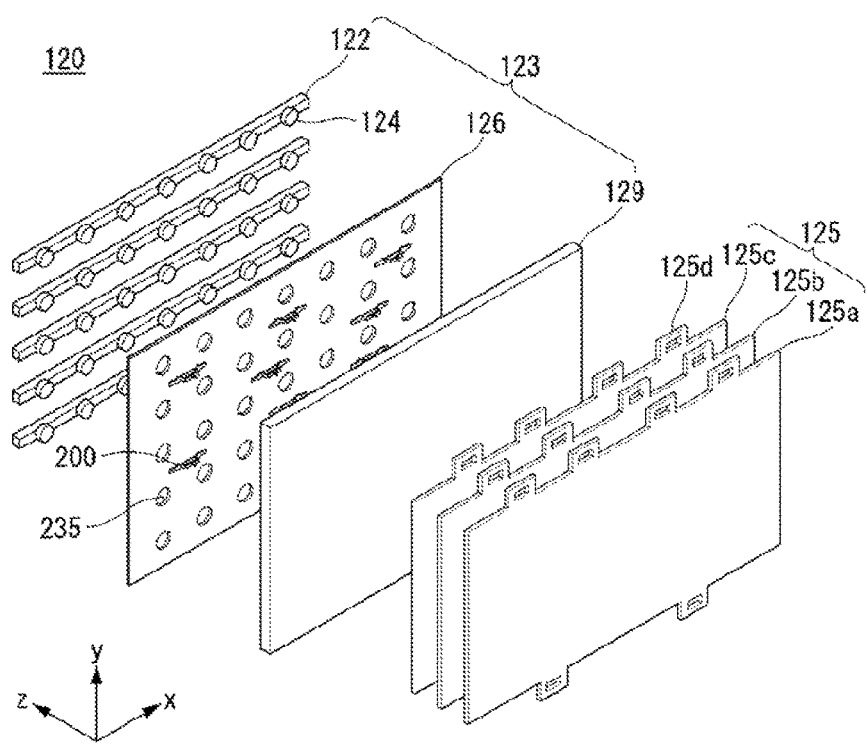
Figure 6:
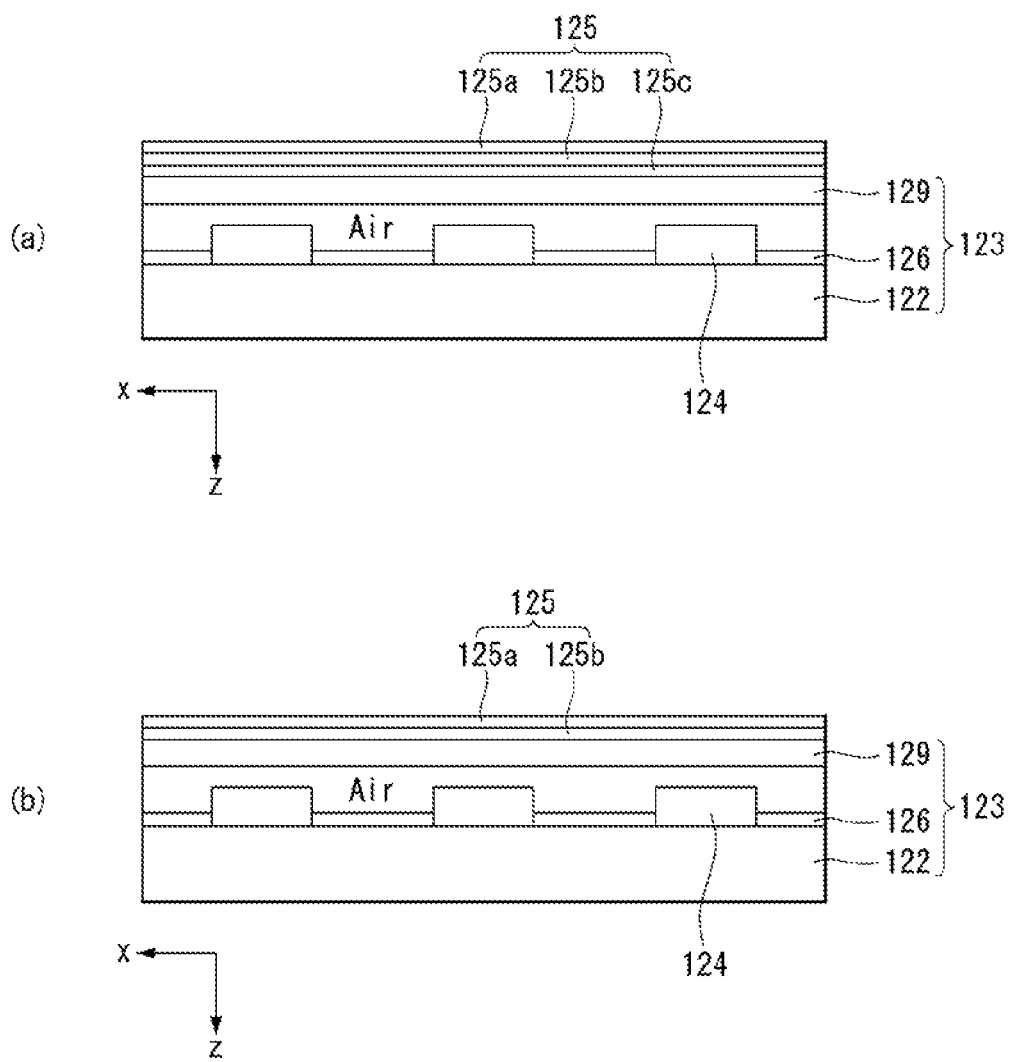

Referring to FIGS. 5 and 6, the backlight unit 120 may include the optical layer 123 including substrates 122, at least one light assembly 124, a reflective sheet 126 and the diffusion plate 129, and the optical sheet 125 positioned on a front surface of the optical layer 123.

The substrates 122 may be configured in a plurality of straps, which are extended in a first direction and are spaced apart from one another by a predetermined distance in a second direction perpendicular to the first direction.

At least one light assembly 124 may be mounted on the substrate 122. The substrate 122 may have an electrode pattern for connecting an adaptor to the light assembly 124. For example, a carbon nanotube electrode pattern for connecting the adaptor to the light assembly 124 may be formed on the substrate 122.

The substrate 122 may be formed of at least one of polyethylene terephthalate (PET), glass, polycarbonate (PC), and silicon. The substrate 122 may be a printed circuit board (PCB), on which at least one light assembly 124 is mounted.

The light assemblies 124 may be disposed on the substrate 122 at predetermined intervals in the first direction. A diameter of the light assembly 124 may be greater than a width of the substrate 122. Namely, the diameter of the light assembly 124 may be greater than a second direction length of the substrate 122.

The light assembly 124 may be one of a light emitting diode (LED) chip and a LED package having at least one LED chip.

The light assembly 124 may be configured as a colored LED emitting at least one of red, green, and blue light or a white LED. The colored LED may include at least one of a red LED, a green LED, and a blue LED.

The light source included in the light assembly 124 may be a COB (chip-on board) type. The COB light source may be configured such that the LED chip as the light source is directly coupled to the substrate 122. Thus, a manufacturing process may be simplified. Further, a resistance may be reduced, and thus a loss of energy resulting from heat may be reduced. Namely, power efficiency of the light assembly 124 may increase. The COB light source can provide the brighter lighting and may be implemented to be thinner and lighter than a related art.

The reflective sheet 126 may be positioned at the front surface of the substrate 122. The reflective sheet 126 may be positioned in an area excluding a formation area of the light assemblies 124 of the substrates 122. Namely, the reflective sheet 126 may have a plurality of lens holes 235.

The reflective sheet 126 may reflect light emitted from the light assembly 124 to a front surface of the reflective sheet 126. Further, the reflective sheet 126 may again reflect light reflected from the diffusion plate 129.

The reflective sheet 126 may include at least one of metal and metal oxide, each of which is a reflection material. The reflective sheet 126 may include metal and/or metal oxide having a high reflectance, for example, aluminum (Al), silver (Ag), gold (Au), and titanium dioxide ($TiO_2$).

The reflective sheet 126 may be formed by depositing and/or coating the metal or the metal oxide on the substrate 122. An ink including the metal material may be printed on the reflective sheet 126. A deposition layer may be formed on the reflective sheet 126 using a thermal deposition method, an evaporation method, or a vacuum deposition method such as a sputtering method. A coating layer and/or a printing layer may be formed on the reflective sheet 126 using a printing method, a gravure coating method or a silk screen method.

An air gap may be positioned between the reflective sheet 126 and the diffusion plate 129. The air gap may serve as a buffer capable of widely spreading light emitted from the light assembly 124. A supporter (or support plate) 200 may be positioned between the reflective sheet 126 and the diffusion plate 129, so as to maintain the air gap.

A resin may be deposited on the light assembly 124 and/or the reflective sheet 126. The resin may function to diffuse light emitted from the light assembly 124.

The diffusion plate 129 may upwardly diffuse light emitted from the light assembly 124.

The optical sheet 125 may be positioned at a front surface of the diffusion plate 129. A back surface of the optical sheet 125 may be adhered to the diffusion plate 129, and a front surface of the optical sheet 125 may be adhered to the back surface of the display panel 110.

The optical sheet 125 may include at least one sheet. More specifically, the optical sheet 125 may include one or more prism sheets and/or one or more diffusion sheets. The plurality of sheets included in the optical sheet 125 may be attached and/or adhered to one another.

In other words, the optical sheet 125 may include a plurality of sheets having different functions. For example, the optical sheet 125 may include first to third optical sheets 125a to 125c. The first optical sheet 125a may function as a diffusion sheet, and the second and third optical sheets 125b and 125c may function as a prism sheet. The number and/or a position of the diffusion sheet and the prism sheets may be changed. For example, the optical sheet 125 may include the first optical sheet 125a as the diffusion sheet and the second optical sheet 125b as the prism sheet.

The diffusion sheet may prevent light coming from the diffusion plate from being partially concentrated and may homogenize a luminance of the light. The prism sheet may concentrate light coming from the diffusion sheet and may make the concentrated light be vertically incident on the display panel 110.

The coupling portion 125d may be formed on at least one of edges of the optical sheet 125. The coupling portion 125d may be formed on at least one of the first to third optical sheets 125a to 125c.

The coupling portion 125d may be formed at an edge of the long side of the optical sheet 125. The coupling portion 125d on the first long side and the coupling portion 125d on the second long side may be asymmetrical to each other. For example, the number and/or a position of the coupling portions 125d on the first long side may be different from the number and/or a position of the coupling portions 125d on the second long side.

Figure 7:
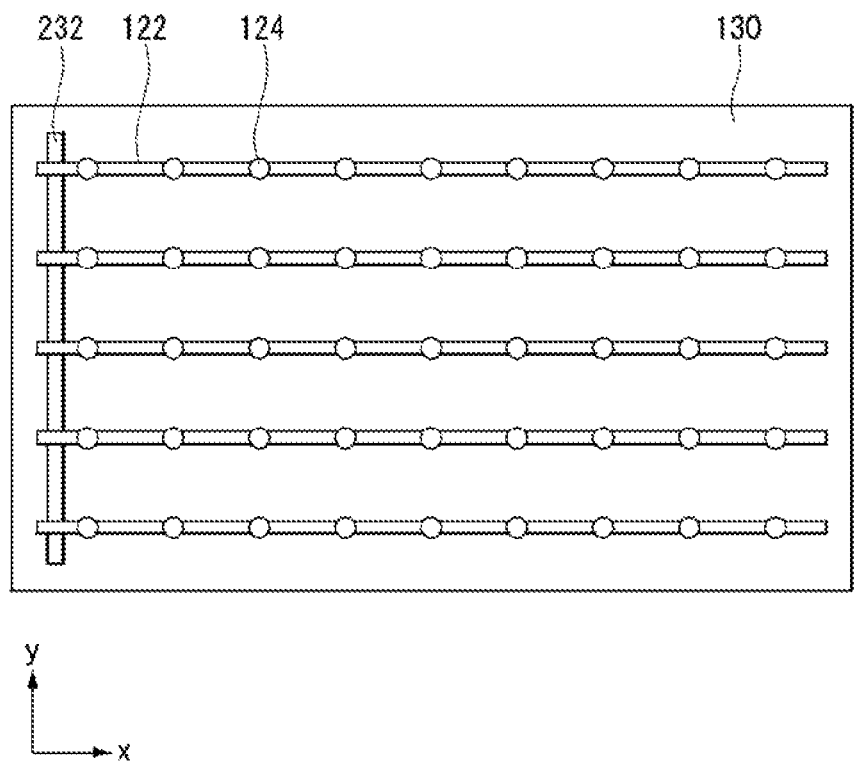

Referring to FIG. 7, the substrates 122 including the plurality of straps, which is extended in the first direction and are spaced apart from one another by a predetermined distance in the second direction perpendicular to the first direction, may be provided on the frame 130. One end of each of the plurality of substrates 122 may be connected to a line electrode 232.

The line electrode 232 may be extended in the second direction. The line electrode 232 may be connected to the ends of the substrates 122 at predetermined intervals in the second direction. The substrates 122 may be electrically connected to the adaptor through the line electrode 232.

The light assemblies 124 may be mounted on the substrate 122 at predetermined intervals in the first direction. A diameter of the light assembly 124 may be greater than a width of the substrate 122 in the second direction. Hence, an outer area of the light assembly 124 may be positioned beyond a formation area of the substrate 122.

Figure 8:
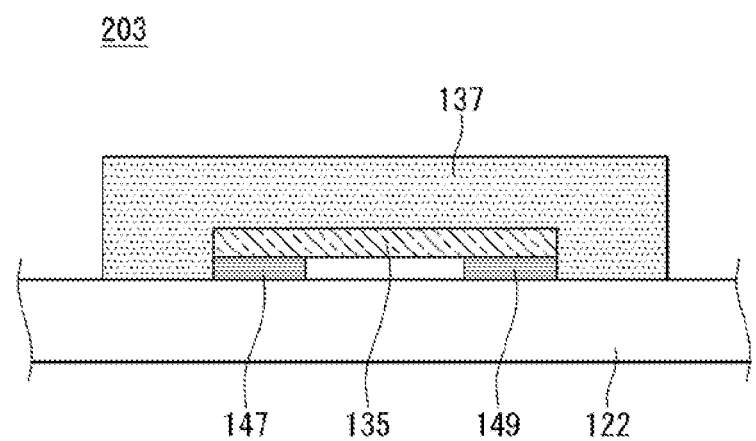
FIGS. 8 and 9 illustrate a light source according to an embodiment of the invention.
Figure 9:
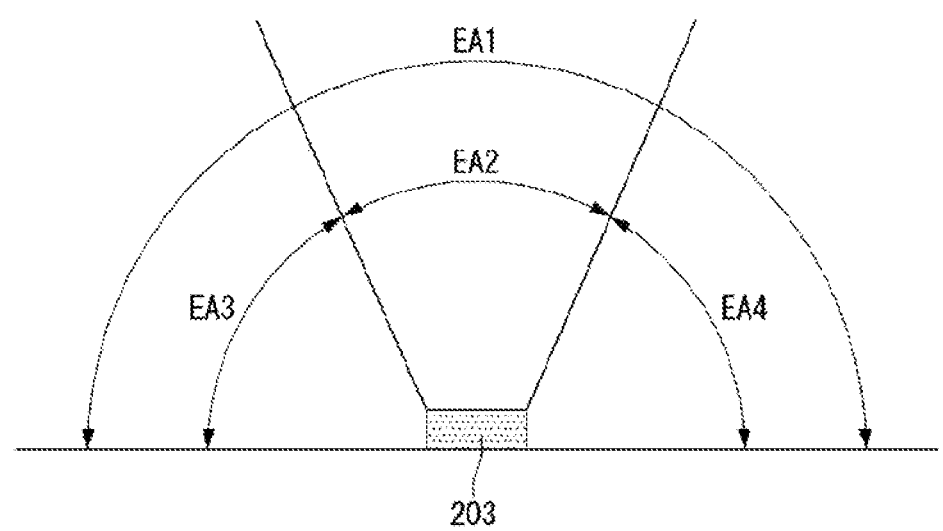

FIGS. 8 and 9 illustrate a light source according to the embodiment of the invention.

As shown in FIG. 8, a light source 203 may be a COB light source. The COB light source 203 may include at least one of an emission layer 135, first and second electrodes 147 and 149, and a fluorescent layer 137.

The emission layer 135 may be positioned on the substrate 122. The emission layer 135 may emit one of red, green, and blue light. The emission layer 135 may include one of Firpic, (CF3ppy)2Ir(pic), 9,10-di(2-naphthyl)anthracene(AND), perylene, distyrybiphenyl, PVK, OXD-7, UGH-3(Blue), and a combination thereof.

The first and second electrodes 147 and 149 may be positioned on both sides of a lower surface of the emission layer 135. The first and second electrodes 147 and 149 may transmit an external driving signal to the emission layer 135.

The fluorescent layer 137 may cover the emission layer 135 and the first and second electrodes 147 and 149. The fluorescent layer 137 may include a fluorescent material converting light of a spectrum generated from the emission layer 135 into white light. A thickness of the emission layer 135 at an upper side of on the fluorescent layer 137 may be uniform. The fluorescent layer 137 may have a refractive index of 1.4 to 2.0.

The COB light source 203 according to the embodiment of the invention may be directly mounted on the substrate 122. Thus, the size of the light assembly 124 may decrease.

Because heat dissipation of the light sources 203 is excellent by forming the light sources 203 on the substrate 122, the light sources 203 may be driven at a high current.

Hence, the number of light sources 203 required to secure the same light quantity may decrease.

Further, because the light sources 203 are mounted on the substrate 122, a wire bonding process may not be necessary. Hence, the manufacturing cost may be reduced due to the simplification of the manufacturing process.

As shown in FIG. 9, the light source 203 according to the embodiment of the invention may emit light in a first emission range EA1. Namely, the light source 203 may emit light in an area including a second emission range EA2 of the front side and third and fourth emission ranges EA3 and EA4 of both sides. Thus, the light source 203 according to the embodiment of the invention is different from a related art POB light source emitting light in the second emission range EA2. In other words, the light source 203 according to the embodiment of the invention may be the COB light source, and the COB light source 203 may emit light in a wide emission range including the side.

Because the COB light source 203 emits light even in a direction corresponding to the third and fourth emission ranges EA3 and EA4 of the side, the embodiment of the invention needs to efficiently control light of the side direction. The reflective sheet according to the embodiment of the invention may control a reflectance of light emitted from the light source 203 in the side direction. Thus, the embodiment of the invention may reduce the non-uniformity of brightness resulting from light of the side direction.

Figure 10:
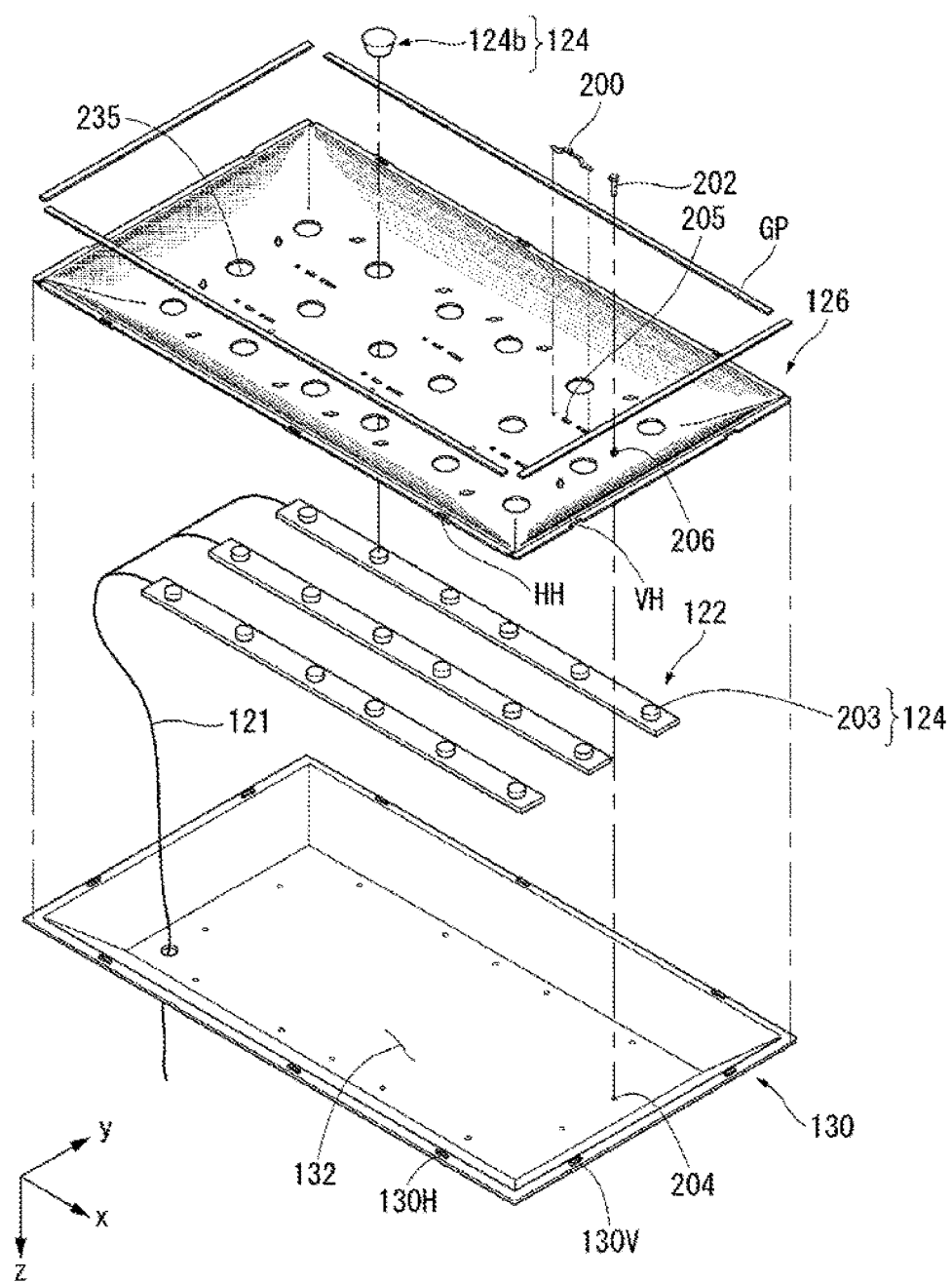
FIG. 10 illustrates a coupling relationship between a reflective sheet and periphery components of the reflective sheet according to an embodiment of the invention.

FIG. 10 illustrates a coupling relationship between a reflective sheet and periphery components of the reflective sheet according to the embodiment of the invention.

As shown in FIG. 10, the reflective sheet 126 according to the embodiment of the invention may be placed on the frame 130. For example, the reflective sheet 126 may be coupled to a receiving portion 132 formed inside the frame 130.

The reflective sheet 126 may include a horizontal coupling portion HH and/or a vertical coupling portion VH. For example, coupling holes may be formed along a long side and/or a short side of the reflective sheet 126.

The horizontal coupling portion HH and/or the vertical coupling portion VH may be inserted into a horizontal protrusion 130H and/or a vertical protrusion 130V formed on the frame 130. A guide panel GP may be formed on the reflective sheet 126.

The guide panel GP may be formed of a plastic material of injection molding or a metal material that is press-processed. The guide panel GP may be coupled to the horizontal protrusion 130H and/or the vertical protrusion 130V. When the guide panel GP is coupled to the reflective sheet 126, the reflective sheet 126 may be fixed between the frame 30 and the guide panel GP. FIG. 10 illustrates that the long sides and the short sides of the guide panel GP are separated from one another, by way of example. The guide panel GP may be configured such that the long sides and the short sides are connected to one another.

The reflective sheet 126 placed on the frame 130 may be configured as a three-dimensional shape corresponding to a shape of the receiving portion 132. Even when the reflective sheet 126 according to the embodiment of the invention has the three-dimensional shape, the reflective sheet 126 can provide an optimum reflection effect. For example, the reflective sheet 126 can uniformly reflect light throughout its entire area.

The reflective sheet 126 may constitute a portion of the backlight unit 120 (see FIG. 5). The substrate 122, on which the light sources 203 are mounted, may be positioned between the reflective sheet 126 and the frame 130.

The plurality of substrates 122 may be arranged in the horizontal direction and/or the vertical direction. The substrates 122 may be connected to signal lines 121 connected to a controller, etc., of the display device 100. The signal lines 121 may be connected to the substrates 122 through holes formed in the frame 130.

The reflective sheet 126 may include a plurality of lens holes 235. The plurality of lens holes 235 may correspond to the light sources 203 on the substrate 122. For example, the plurality of lens holes 235 may be arranged in the horizontal direction and/or the vertical direction correspondingly to the light sources 203. A lens 124b may be inserted into the lens hole 235. For example, the lens 124b may be coupled to the light source 203 through the lens hole 235.

The reflective sheet 126 may include a plurality of support holes (or support plate holes) 205. A supporter 200 may be coupled to the support hole 205. The supporter 200 may support the optical sheet 125 and/or the diffusion plate 129 positioned in front of the reflective sheet 126. Namely, the reflective sheet 126 may be spaced apart from the optical sheet 125 and/or the diffusion plate 129 by a predetermined distance.

The reflective sheet 126 may include a plurality of fixing pin holes 206. A fixing pin 202 may be coupled to the fixing pin hole 206. Also, the fixing pin 202 may be coupled to a frame hole 204 formed in the frame 130. Thus, the fixing pin 202 may fix the reflective sheet 126 to the frame 130.

Figure 11:
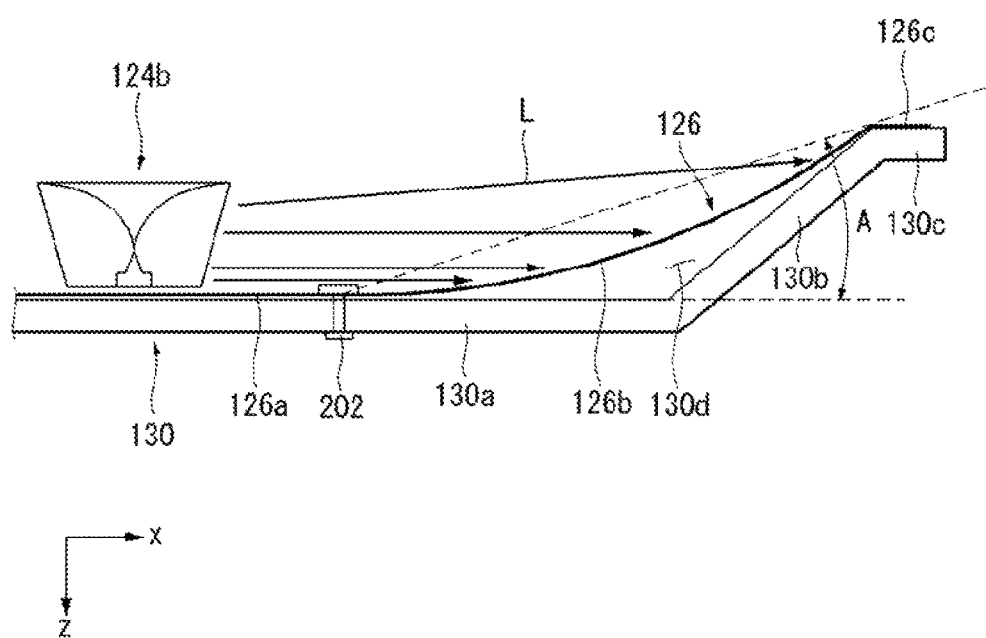
FIGS. 11 to 13 illustrate configuration of a reflective sheet according to an embodiment of the invention.
Figure 12:
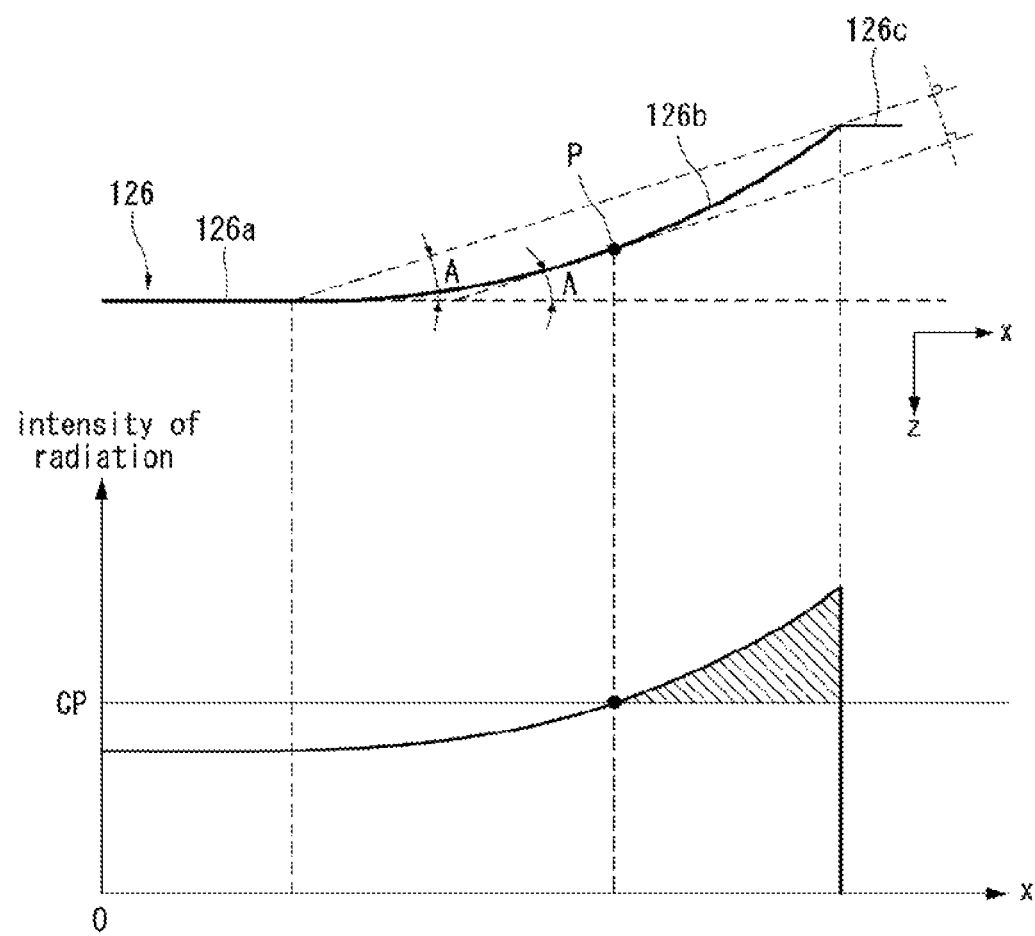
Figure 13:
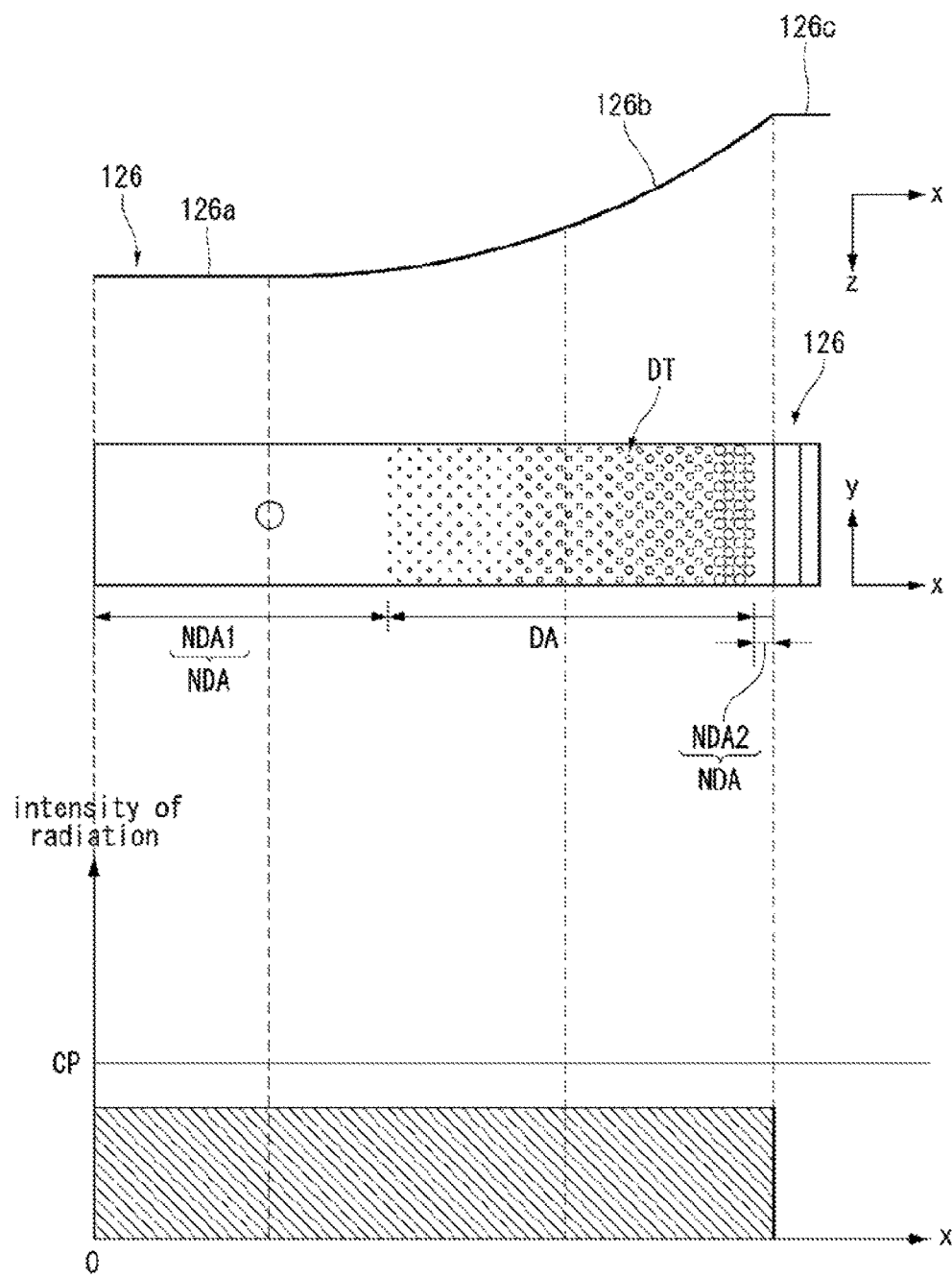

FIGS. 11 to 13 illustrate configuration of the reflective sheet according to the embodiment of the invention.

As shown in FIGS. 11 to 13, the reflective sheet 126 according to the embodiment of the invention may be placed in an inner area of the frame 130. The reflective sheet 126 placed on the frame 130 may have the three-dimensional shape corresponding to a shape of the frame 130.

As shown in FIG. 11, the frame 130 may include first to third frame areas 130a to 130c.

The first frame area 130a may be a bottom surface of the frame 130. The second frame area 130b may be substantially flat. Namely, the second frame area 130b may be a surface positioned on an X-Y plane of the display device 100.

The second frame area 130b may be a sidewall surface extended upwardly from the first frame area 130a. The second frame area 130b may be extended in a direction parallel to a z-axis direction or a direction inclined to the z-axis direction. The receiving portion 132 (see FIG. 10) may be formed inside the frame 130 by the second frame area 130b serving as a sidewall of the frame 130.

The third frame area 130c may be a surface extended from the second frame area 130b in an x-axis direction. The third frame area 130c may be substantially parallel to the first frame area 130a. Namely, the third frame area 130c may be a flat surface in the same manner as the first frame area 130a although it is at a height level different from the first frame area 130a by the second frame area 130b.

The third frame area 130c may include a protruding area. The third frame area 130c may be coupled to a protrusion formed through a separate process. The protruding area and/or the protrusion of the third frame area 130c may be coupled to the reflective sheet 126. For example, the protruding area and/or the protrusion of the third frame area 130c may be coupled to a third sheet area 126c of the reflective sheet 126. The protruding area and/or the protrusion of the third frame area 130c may be coupled to the optical sheet 125 (see FIG. 5).

The reflective sheet 126 may be coupled to an area formed by the first to third frame areas 130a to 130c of the frame 130. For example, the reflective sheet 126 may be coupled to the first frame area 130a through the fixing pin 202. When a portion of the reflective sheet 126 is coupled to the first frame area 130a through the fixing pin 202, the portion of the reflective sheet 126 may naturally contact the frame 130.

When the reflective sheet 126 is coupled to the frame 130 through the fixing pin 202, the shape of the reflective sheet 126 may be naturally changed depending on the shape of the frame 130. Namely, a naturally rounded second sheet area 126b of the reflective sheet 126 may be formed. Thus, a separate process for forming a chamfer of the reflective sheet 126 may not be necessary, and workability may be improved.

The reflective sheet 126 may include first to third sheet areas 126a to 126c. Namely, an area of the reflective sheet 126 may be divided depending on whether or not the reflective sheet 126 and the frame 130 contact each other. For example, the area of the reflective sheet 126 may be divided into a contact area contacting the frame 130 and a non-contact area not contacting the frame 130.

The area of the reflective sheet 126 may be divided or delineated into the first sheet area 126a and the second sheet area 126b by the fixing pin 202. In other words, the second sheet area 126b may be an area between the fixing pin 202 and a portion contacting the third frame area 130c. Namely, the first sheet area 126a and the second sheet area 126b may be determined depending on whether or not the reflective sheet 126 contacts the first frame area 130a of the frame 130.

The second sheet area 126b may be naturally spaced apart from the frame 130 by properties and elasticity of the reflective sheet 126. For example, when the first sheet area 126a is coupled to the frame 130 by the fixing pin 202, the second sheet area 126b may naturally form a curved surface by its own weight and may be spaced apart from the frame 130. A separation space 130d may be formed between the second sheet area 126b and the frame 130. An angle formed by the second sheet area 126b of the reflective sheet 126 and the bottom surface of the frame 130 may gradually increase. Namely, in the non-contact area of the reflective sheet 126, the reflective sheet 126 may have a two-dimensional curve shape. Thus, the second sheet area 126b may be spaced apart from the frame 130 at a predetermined angle.

The third sheet area 126c may be placed in the third frame area 130c. The third sheet area 126c may be coupled to the third frame area 130c. Alternatively, the third sheet area 126c may be naturally positioned on the third frame area 130c. Namely, the third sheet area 126c may contact the third frame area 130c by an elastic force of the z-axis direction resulting from the rounded second sheet area 126b.

Light L may be emitted through the lens 124b. Namely, light generated in the light source 203 may be emitted to the outside through the lens 124b. The light L emitted through the lens 124b may travel through various paths. For example, a portion of the light L may travel through a path of the side direction of the lens 124b.

The portion of the light L on the path of the side direction may travel toward the second sheet area 126b. At least a portion of light generated in the light source 203 may be totally reflected to the inside of the lens 124b and may travel toward the second sheet area 126b. In this instance, an amount of light L upwardly travelling to the second sheet area 126b may be more than an amount of light L downwardly travelling to the second sheet area 126b. In other words, an amount and/or a density of light L transferred to the reflective sheet 126 may be non-uniform. When the amount and/or the density of the light L is not uniform, a viewer watching the display device 100 may perceive non-uniformity of the amount and/or the density of the light L. For example, when an amount of light L incident on an upper portion of the second sheet area 126b is more than an amount of light L incident on a lower portion of the second sheet area 126b, a corresponding area may be recognized as being brighter than other areas because of the light L reflected from the upper portion of the second sheet area 126b.

As shown in FIG. 12, an angle formed by an extension line from a boundary between the first sheet area 126a and the second sheet area 126b to a boundary between the second sheet area 126b and the third sheet area 126c and a straight line parallel to the x-axis direction may be called "A". An inclined angle of the second sheet area 126b may increase from an intersection point P (as a starting point) between the second sheet area 126b and a straight line of the angle A. Namely, an angle of the second sheet area 126b with respect to the x-axis while passing the intersection point P may sharply increase.

Because the angle of the second sheet area 126b while passing the intersection point P increases, a density of the light L emitted from the lens 124b (see FIG. 11) per unit area may further increase. Thus, a corresponding portion may be seen as being brighter than other portions. As a result, the viewer may feel that the light is not uniform. The display device 100 according to the embodiment of the invention can allow light to be uniformly reflected from the reflective sheet 126. Hence, the viewer cannot feel or can feel less the non-uniformity of the light.

As shown in FIG. 13, in the display device 100 according to the embodiment of the invention, dots DT may be formed in at least a portion of the reflective sheet 126.

The dots DT may be an area having a pattern different from other areas. The dots DT may be an area of uneven portions (or concave-convex portions) formed on the reflective sheet 126. The dots DT may be an area, in which at least a portion of the reflective sheet 126 is colored. For example, the dots DT may be an area of a relatively dark color. For example, the dots DT may be a black or gray area. The dots DT may be an area, in which the uneven portions and the colored portions are mixed with each other. The dots DT may have a geometric shape, in which there is a difference in at least one of a shape, a size, a location, and a color. For example, the dots DT may be one of various shapes including a circle, an oval, a rectangle, a rod, a triangle, etc., formed on the reflective sheet 126 and/or a combination of the various shapes.

The dots DT may affect a reflectance of a corresponding area. Namely, the dots DT may change a reflectance of light. For example, the reflectance of light may be reduced depending on at least one of a shape, a size, a location, and a color of the dots DT. The plurality of dots DT may gather (or arranged) and form a dot area DA.

The dot area DA may be a gathering (or arranging) of the dots DT. Namely, the dot area DA may be a formation area of the plurality of dots DT, that are the same as or different from one another in at least one of a shape, a size, a location, and a color. For example, the dot area DA may be formed in at least a portion of the second sheet area 126b. As described above, a density of light per unit area in the second sheet area 126b may be high because of the inclined shape of the second sheet area 126b. The dot area DA may change a reflectance of light incident on the second sheet area 126b. In other words, a density of incident light per unit area is high, but a density of reflected light per unit area may decrease. Thus, a phenomenon, in which a contrast of a portion corresponding to the second sheet area 126b is different from a contrast of other portions, may be prevented. Namely, light can be uniformly reflected from the entire portion of the reflective sheet 126 because of the dot area DA.

The reflective sheet 126 may further include a non-dot area NDA. The non-dot area NDA may be an area, in which there is no dot DT. The non-dot area NDA may be positioned in various areas of the reflective sheet 126. For example, the non-dot area NDA may include first and second non-dot areas NDA1 and NDA2.

The second non-dot area NDA2 may be positioned at a boundary between the second sheet area 126b and the third sheet area 126c. The second non-dot area NDA2 may be positioned in the second sheet area 126b at the boundary between the second sheet area 126b and the third sheet area 126c.

The second non-dot area NDA2 may be an uppermost area of the second sheet area 126b and thus may be close to the optical sheet 125 and/or the diffusion plate 129 positioned in front of the reflective sheet 126. Hence, if the dot DT exists in the second non-dot area NDA2, the user of the display device 100 may observe the dot DT. Thus, the dot DT may not exist in the second non-dot area NDA2.

FIGS. 14 to 17 illustrate a distribution of dots of the reflective sheet according to the embodiment of the invention.

As shown in FIGS. 14 to 23, the dots DT of the reflective sheet 126 according to the embodiment of the invention may be disposed in various shapes.

Figure 14:
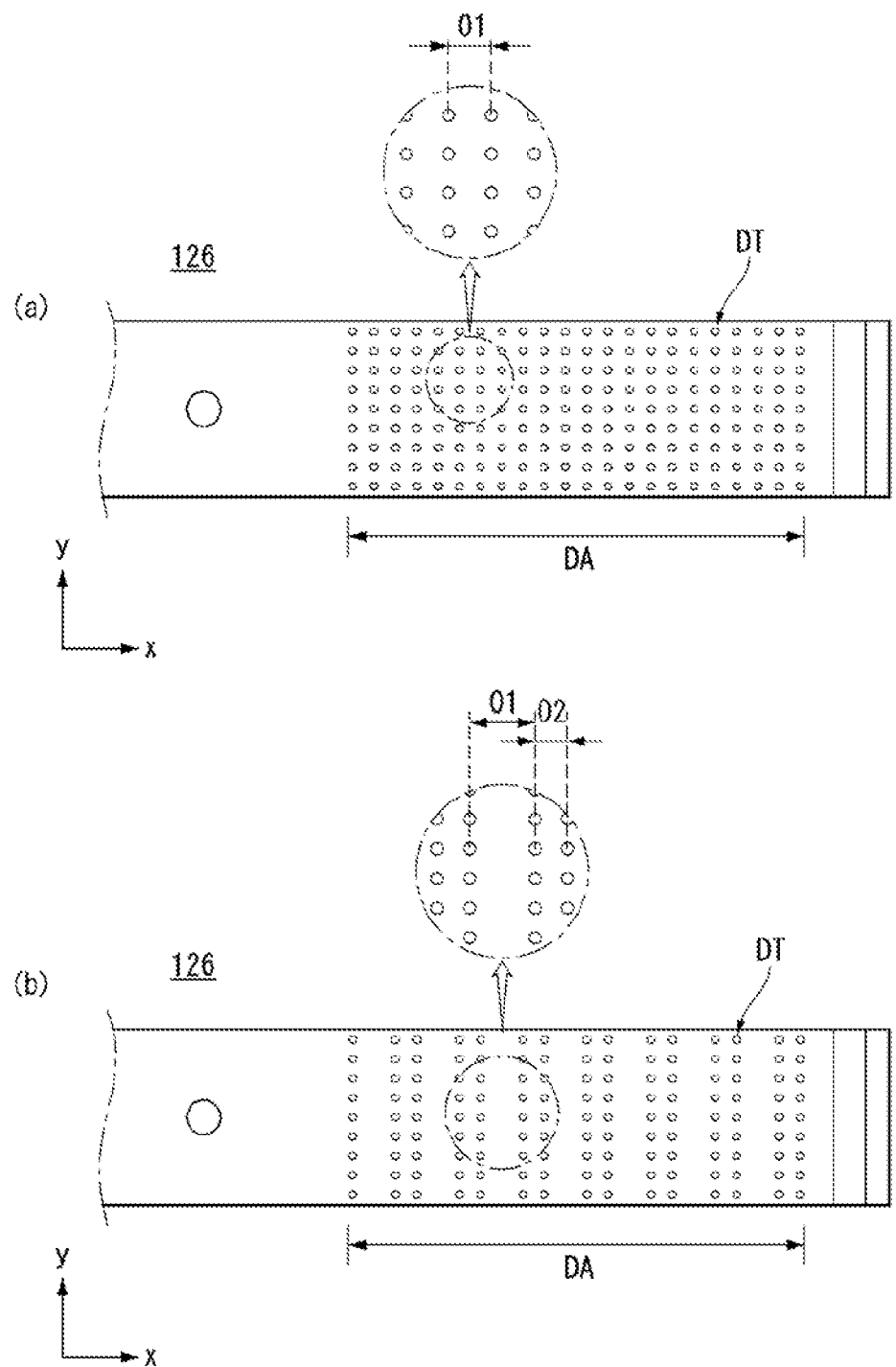
FIGS. 14 to 17 illustrate a distribution of dots of a reflective sheet according to an embodiment of the invention.

As shown in (a) of FIG. 14, the dots DT may be disposed in the dot area DA. The adjacent dots DT may be spaced apart from each other by a first distance O1. Namely, the dots DT may be disposed at regular intervals of the first distance O1.

The distance between the dots DT may affect the reflectance of the reflective sheet 126. For example, when the distance between the dots DT decreases, the reflectance may decrease.

As shown in (b) of FIG. 14, the adjacent dots DT may be spaced apart from each other by the first distance O1, and the adjacent dots DT may be spaced apart from each other by a second distance O2. Namely, a distance between the dots DT may not be uniform As shown in (a) of FIG. 15, the dot area DA may be divided into a plurality of areas. For example, the dot area DA may be divided into a first area P1 and a second area P2. An attribute of dots DT included in the first area P1 may be different from an attribute of dots DT included in the second area P2. For example, at least one of a size, a density, and a color of a first dot DT1 in the first area P1 may be different from at least one of a size, a density, and a color of a second dot DT2 in the second area P2.

The second area P2 may be positioned further to the outside than the first area P1. Namely, the second area P2 may be an area close to the third sheet area 126c. The second dot DT2 of the second area P2 may be larger than the first dot DT1 of the first area P1. Thus, a reflectance of the second area P2 may be less than a reflectance of the first area P1.

Figure 15:
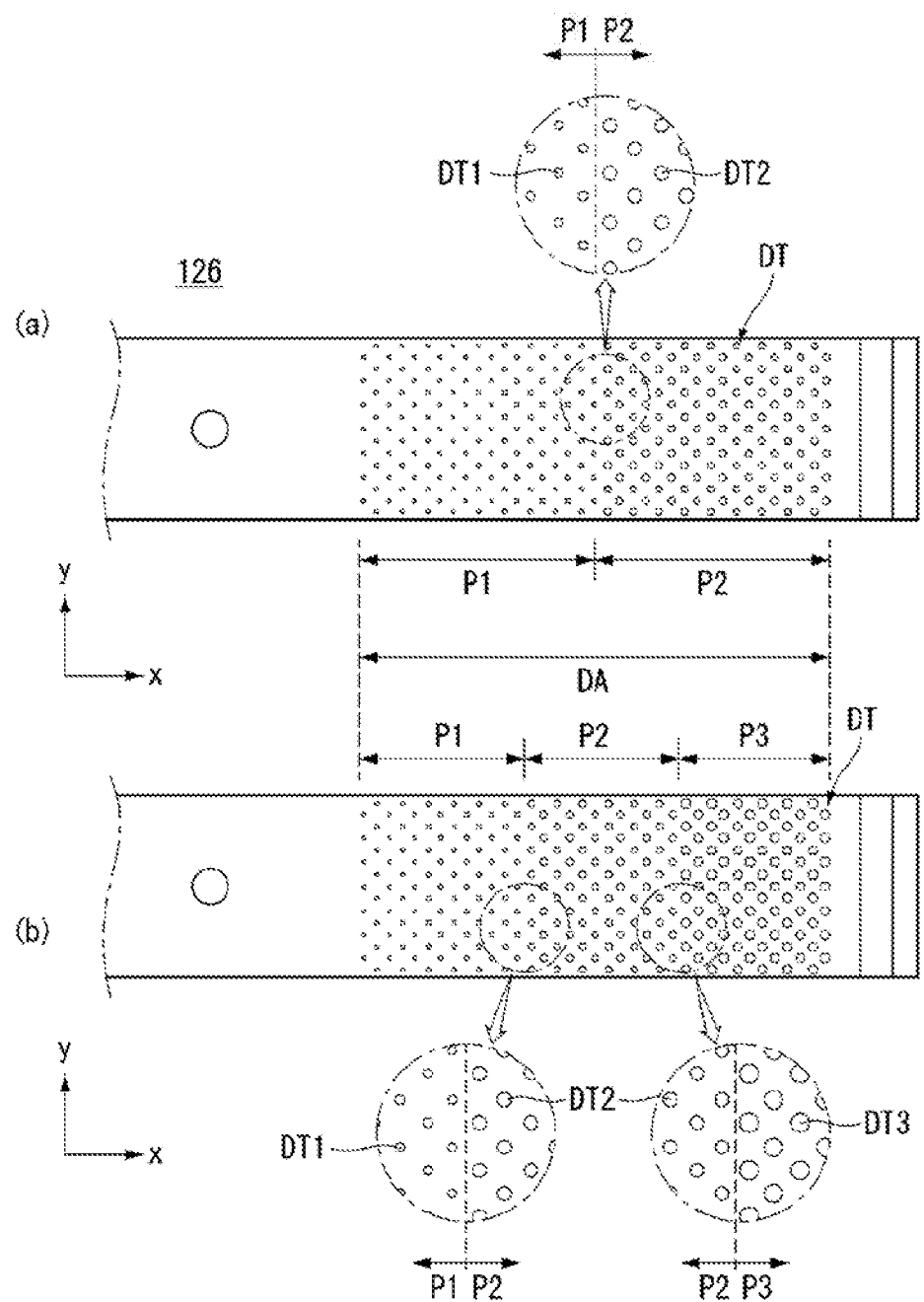

As shown in (b) of FIG. 15, the dot area DA may be divided into a plurality of areas. For example, the dot area DA may be divided into first to third areas P1 to P3. First to third dots DP1 to DP3 of the first to third areas P1 to P3 may have different attributes. For example, the second dot DT2 may be larger than the first dot DT1, and the third dot DT3 may be larger than the second dot DT2. Alternatively, the first to third dots DP1 to DP3 have the same size, but a density of the first area P1 may be different from a density of the second area P2, and a density of the second area P2 may be different from a density of the third area P3. For example, the density of the first area P1 may be less than the density of the second area P2, and the density of the second area P2 may be less than the density of the third area P3.

Figure 16:
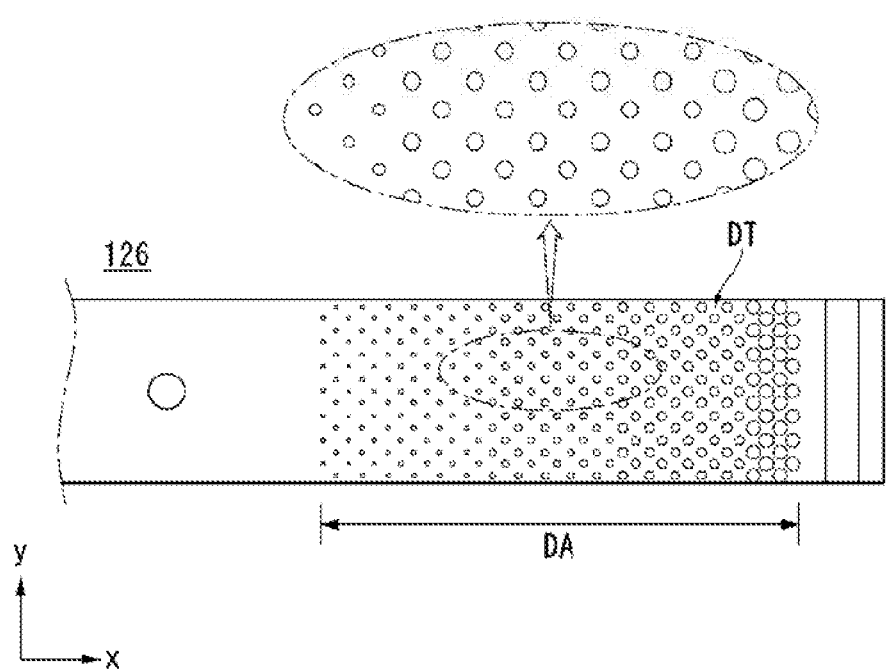

As shown in FIG. 16, the dot area DA may not be divided into a plurality of areas. However, dots DT included in the dot area DA may be different from each other in at least one of a size, a density, and a color. For example, as the dot DT goes along the x-axis direction, the size of the dot DT may gradually increase. Namely, an attribute of the dot DT including at least one of the size, the density, and the color may gradually change.

Figure 17:
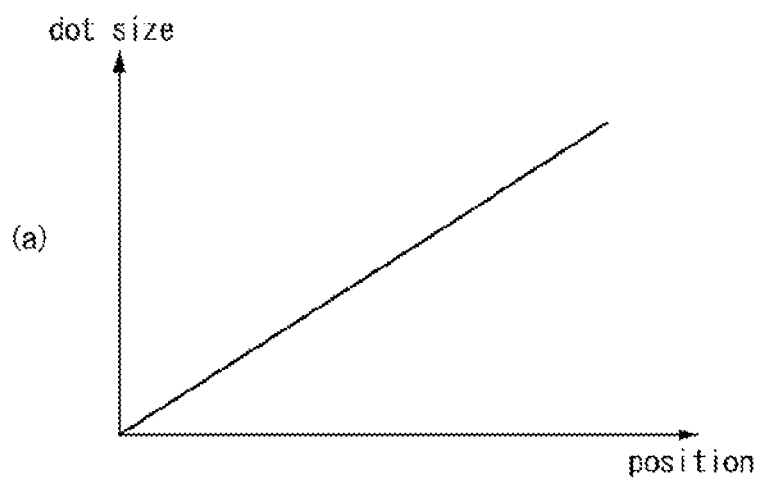
Figure 17:
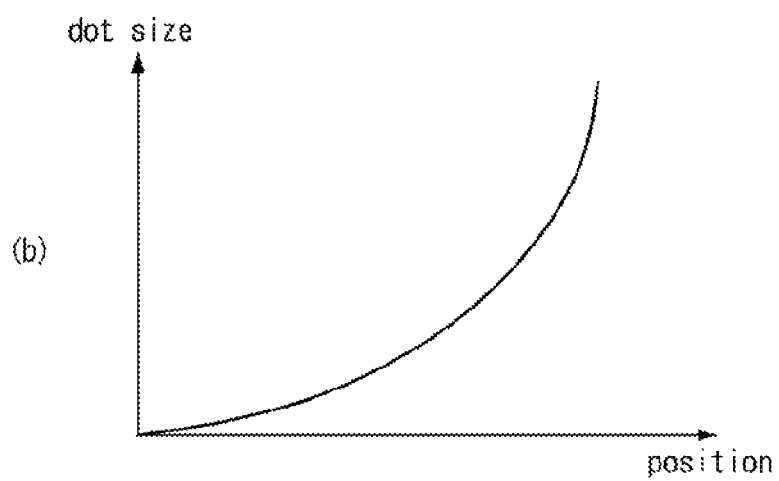

As shown in (a) of FIG. 17, a size of the dot DT may gradually change depending on a location.

As shown in (b) of FIG. 17, a size of the dot DT may sharply change depending on a location. For example, the size of the dot DT may be changed in a curve shape of a quadratic function.

Figure 18:
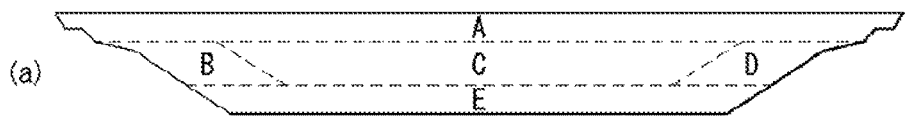
FIGS. 18 and 19 illustrate a distribution of dots according to an embodiment of the invention.
Figure 18:
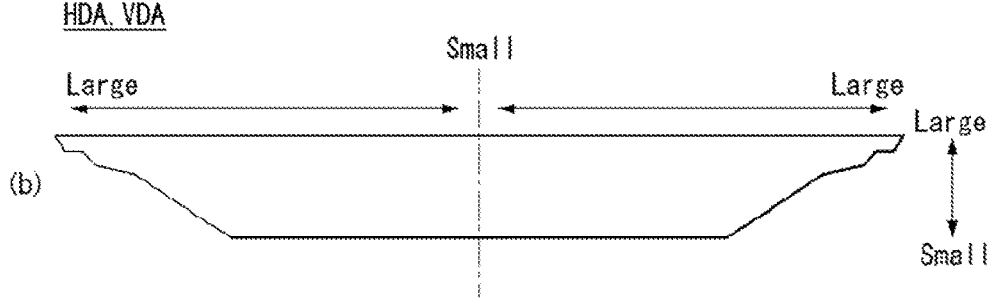
Figure 18:
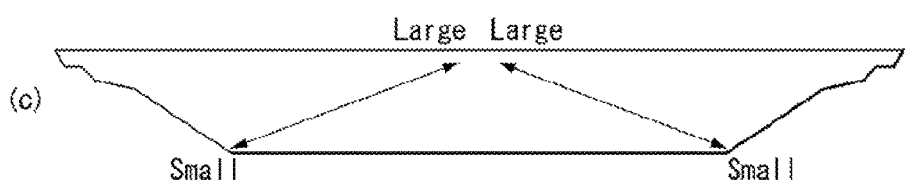
Figure 19:
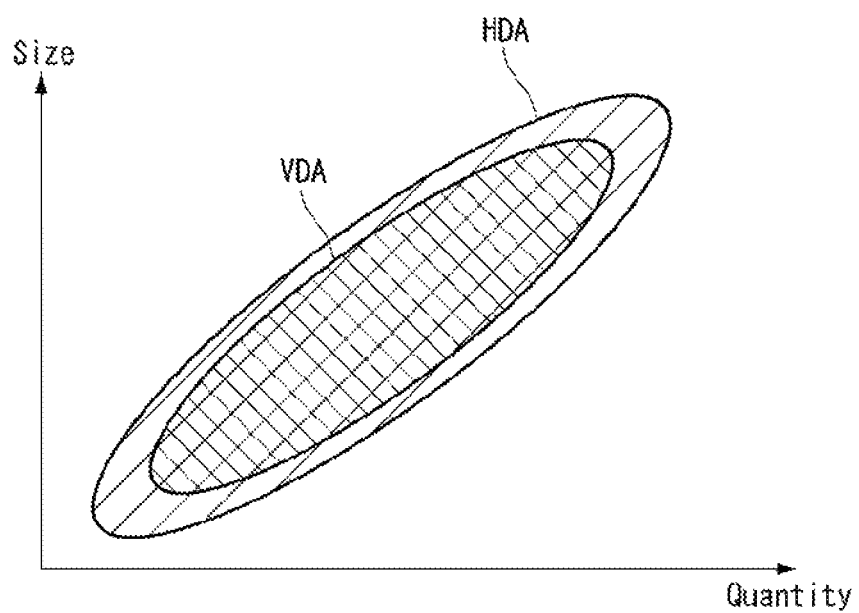

FIGS. 18 and 19 illustrate a distribution of dots according to the embodiment of the invention.

As shown in FIG. 18, dots DT may be disposed in a horizontal dot area HDA and a vertical dot area VDA in various shapes.

The horizontal dot area HDA may be a dot area DA on the long side of the reflective sheet 126, and a vertical dot area VDA may be a dot area DA on the short side of the reflective sheet 126. Detailed locations of the horizontal dot area HDA and the vertical dot area VDA will be described in corresponding paragraphs.

As shown in (a) of FIG. 18, the horizontal dot area HDA and/or the vertical dot area VDA may be divided into a plurality of areas. For example, the horizontal dot area HDA and/or the vertical dot area VDA may be divided into an uppermost area A, a leftmost area B, a rightmost area D, a lowermost area E, and/or a an inner area C. The horizontal dot area HDA and/or the vertical dot area VDA may be divided in different manners.

Dots in the plurality of areas of the horizontal dot area HDA and/or the vertical dot area VDA may have different attributes. For example, a size and/or a density of a dot DT in the uppermost area A may be greater than a size and/or a density of a dot DT in the lowermost area E. A size and/or a density of a dot DT in the inner area C may be greater than a size and/or a density of dots DT in the leftmost area B and the rightmost area D.

As shown in (b) of FIG. 18, the horizontal dot area HDA and/or the vertical dot area VDA may not be divided into a plurality of areas. Namely, the dots DT, of which the attributes gradually change, may be disposed. For example, a size and/or a density of the dot DT may increase as the dot DT goes to the upper side of the horizontal dot area HDA and/or the vertical dot area VDA. The size and/or the density of the dot DT may decrease as the dot DT goes to the inside of the horizontal dot area HDA and/or the vertical dot area VDA.

As shown in (c) of FIG. 18, attributes of dots DT in an inner area and an outer area of the horizontal dot area HDA and/or the vertical dot area VDA may change. For example, a dot DT having a relatively small size may be disposed at a boundary between the left and right sides and/or the lower side of the horizontal dot area HDA and/or the vertical dot area VDA. A dot DT having a relatively large size may be disposed at a boundary between the inside and/or the upper side of the horizontal dot area HDA and/or the vertical dot area VDA.

The attribute of the dot DT including the size may change gradually or non-gradually. For example, in an area ranging from the outer area to the inner area of the horizontal dot area HDA and/or the vertical dot area VDA, the size of the dot DT may gradually change or may change depending on a location. For example, the size of the dot DT in a first area including the left and right sides of the horizontal dot area HDA and/or the vertical dot area VDA may be different from the size of the dot DT in a second area including the inner side of the horizontal dot area HDA and/or the vertical dot area VDA. In other words, there may be a difference in at least one of the size, the color, the interval, and the density of the dots DT disposed in a horizontal direction and/or a vertical direction of the horizontal dot area HDA and/or the vertical dot area VDA. For example, in the instance of the horizontal dot area HDA, sizes of two dots DT positioned adjacent to each other in the horizontal direction of the horizontal dot area HDA may be different from each other. The arrangement of the dots DT may be related to the lens hole positioned along the horizontal direction of the horizontal dot area HDA. Namely, a portion, in which the lens hole is positioned, may be brighter, and other areas may be darker. The dots DT having different attributes may be arranged along the horizontal direction of the horizontal dot area HDA, so as to prevent a luminance difference, in which a brighter portion and a darker portion are present.

As shown in FIG. 19, dots constituting the horizontal dot area HDA and the vertical dot area VDA may have different attributes. For example, a size range of the dots constituting the horizontal dot area HDA may be greater than a size range of the dots constituting the vertical dot area VDA. Namely, the horizontal dot area HDA may include relatively smaller dots and relatively larger dots than the vertical dot area VDA.

A range of an amount of the dots constituting the horizontal dot area HDA may be greater than a range of an amount of the dots constituting the vertical dot area VDA. For example, when the dots having the same size are used, the number of dots included in the horizontal dot area HDA may be more or less than the number of dots included in the vertical dot area VDA.

FIGS. 20 to 31 illustrate various configuration of a reflective sheet according to the embodiment of the invention.

As shown in FIGS. 20 to 31, dots of various shapes and/or various arrangements may be disposed on a reflective sheet 126 according to various embodiments of the invention. The various shapes and/or the various arrangements of the dots are implemented so as to uniformly reflect light. Thus, many repeated experiments and accumulated know-how are necessary to obtain an optimum shape and/or an optimum arrangement of dots.

Figure 20:
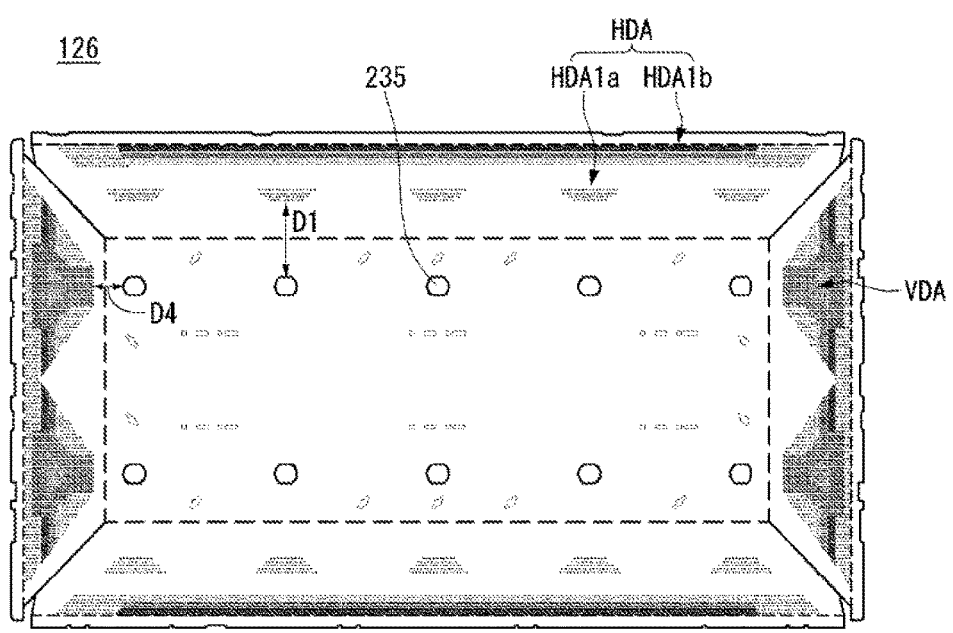
FIGS. 20 to 31 illustrate various configurations of a reflective sheet according to an embodiment of the invention.

As shown in FIG. 20, the reflective sheet 126 may include a horizontal dot area HDA and a vertical dot area VDA. The horizontal dot area HDA may be a dot area formed along a long side of the reflective sheet 126, and the vertical dot area VDA may be a dot area formed along a short side of the reflective sheet 126.

The horizontal dot area HDA may include a first horizontal dot area HDA1a and a second horizontal dot area HDA1b. The first and second horizontal dot areas HDA1a and HDA1b may be spaced apart from each other by a predetermined distance. Namely, the horizontal dot area HDA may not be continuously formed. In other words, a dot may not be formed in at least a portion of the horizontal dot area HDA.

The first horizontal dot area HDA1a may be positioned close to a lens hole 235. Namely, an outer perimeter of the reflective sheet 126 may be positioned closer to the second horizontal dot area HDA1b than the first horizontal dot area HDA1a. In other words, the long side of the reflective sheet 126 may be positioned closer to the second horizontal dot area HDA1b than the first horizontal dot area HDA1a.

The first horizontal dot area HDA1a may have a semi-circular shape. More specifically, the first horizontal dot area HDA1a may have a shape, which protrudes toward the lens hole 235 and is flat with respect to the side of the reflective sheet 126. In other words, the first horizontal dot area HDA1a may have a shape, which protrudes toward the lens hole 235 and is flat with respect to the second horizontal dot area HDA1b.

The lens hole 235 may be positioned closer to the first horizontal dot area HDA1a than the vertical dot area VDA.

For example, a distance from the lens hole 235 to the first horizontal dot area HDA1a may be a first distance D1, and a distance from the lens hole 235 to the vertical dot area VDA may be a fourth distance D4. The fourth distance D4 may be less than the first distance D1.

Figure 21:
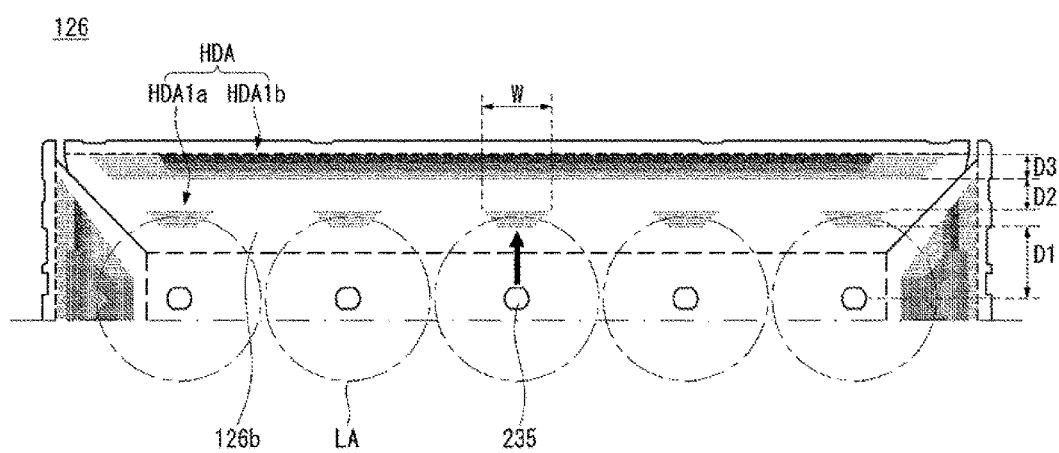

FIG. 21 illustrates a portion of the horizontal dot area HDA of the reflective sheet 126.

As shown in FIG. 21, a plurality of first horizontal dot areas HDA1a of the horizontal dot area HDA may be disposed along the long side of the reflective sheet 126. The plurality of first horizontal dot areas HDA1a may be spaced apart from one another. The first horizontal dot areas HDA1a may be disposed corresponding to the lens holes 235, respectively.

The first horizontal dot area HDA1a may be spaced apart from the lens hole 235 by a first distance D1. The first distance D1 may correspond to a location at which light emitted from the light source coupled to the lens hole 235 intensively reaches the second sheet area 126b of the reflective sheet 126. Namely, the first distance D1 may be determined such that light emitted from the light source is concentrated on the first horizontal dot area HDA1a of the inclined second sheet area 126b.

The first horizontal dot area HDA1a may have a predetermined width W. The width W of the first horizontal dot area HDA1a may correspond to an area on which light emitted from the light source is concentrated. For example, the width W of the first horizontal dot area HDA1a may be determined so that the first horizontal dot area HDA1a covers an area corresponding to the lens hole 235. For example, the width W of the first horizontal dot area HDA1a may be greater than a diameter of the lens hole 235.

A light area LA indicates an imaginary area in which light from the light source emits. As shown in FIG. 21, the light area LA formed by each light source may overlap the first horizontal dot area HDA1a. In particular, light of the light source may be concentrated on a portion corresponding to the first horizontal dot area HDA1a due to characteristics of the light source. The first horizontal dot area HDA1a according to the embodiment of the invention may be disposed at a location on which light of the light source can be concentrated, and thus light may be uniformly reflected by the reflective sheet 126.

The second horizontal dot area HDA1b may be spaced apart from the first horizontal dot area HDA1a by a second distance D2. The dot may not be formed in a portion corresponding to the second distance D2 between the first and second horizontal dot areas HDA1a and HDA1b. The light of the light source may be more concentrated on a location corresponding to the first horizontal dot area HDA1a and may be less concentrated on a location corresponding to the second horizontal dot area HDA1b. Thus, because the dot is not formed in the portion corresponding to the second distance D2, an amount of light reflected from the first horizontal dot area HDA1a may be substantially equal to an amount of light reflected from the portion corresponding to the second distance D2.

A width of the second horizontal dot area HDA1b may correspond to a third distance D3. The light emitted from the light source may be concentrated on a portion corresponding to the second horizontal dot area HDA1b. This can be easily understood when considering that the reflective sheet 126 is inclined in not a straight shape but a curved shape. Namely, a portion corresponding to the second horizontal dot area HDA1b of the reflective sheet 126 inclined in the curved shape may be close to a relatively vertical shape. Thus, light of the light source can be concentrated on a corresponding portion. Further, the second horizontal dot area HDA1b may adjust a reflectance of the concentrated light.

Figure 22:
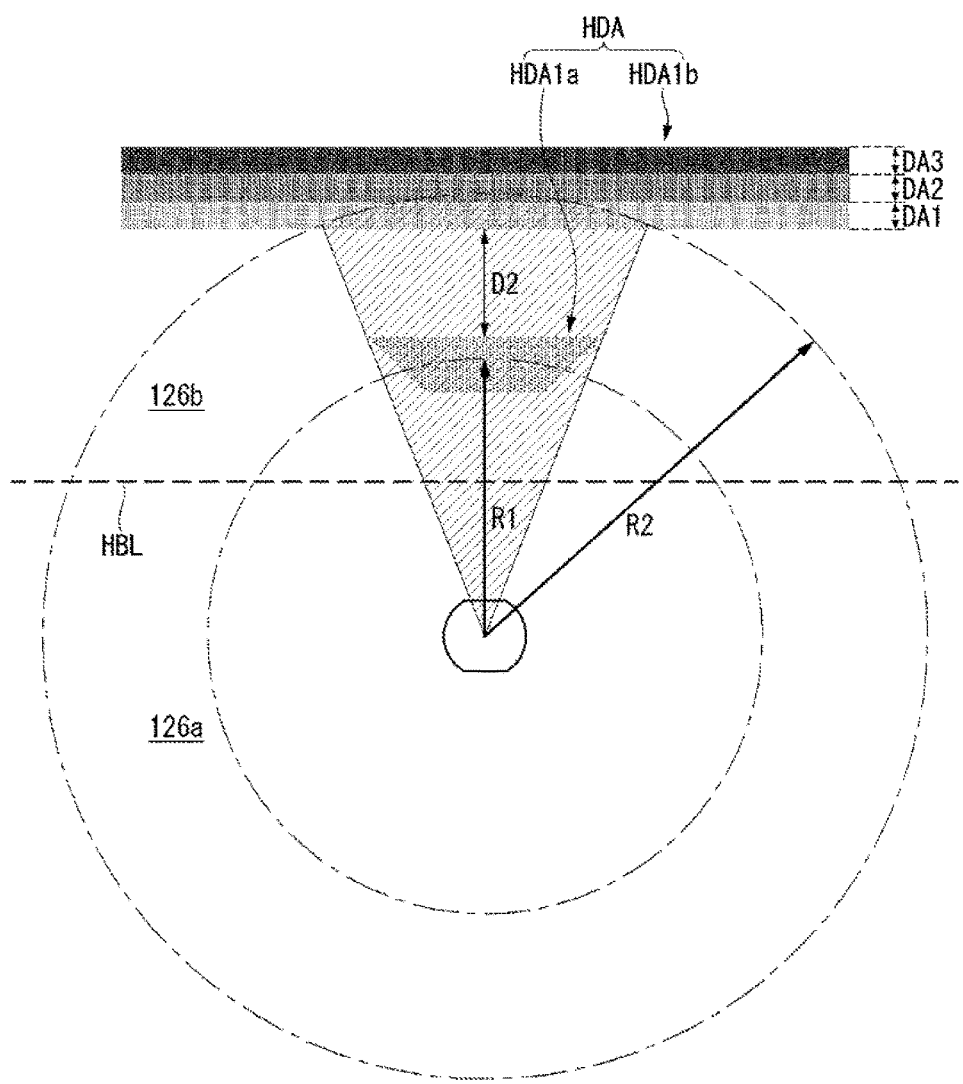

FIG. 22 is an enlarged view of a portion of first and second horizontal dot areas HDA1a and HDA1b.

Light from the light source may not be uniformly concentrated on an entire portion of the reflective sheet 126. Thus, a dense area and a sparse area of light may be generated. For example, a density of light emitted from the light source may increase in a portion having a first radius R1 and a second radius R2. The first and second horizontal dot areas HDA1a and HDA1b according to the embodiment of the invention may be disposed in a dense area of light from the light source and may make a luminance of the light be entirely uniform. For example, the first and second horizontal dot areas HDA1a and HDA1b may be disposed at a location corresponding to the first and second radiuses R1 and R2.

The second horizontal dot area HDA1b may be divided into a plurality of areas. For example, the second horizontal dot area HDA1b may be divided into first to third dot areas DA1 to DA3. A dot of at least one of the first to third dot areas DA1 to DA3 may be different from a dot of other area in at least one of a size, a density, a color, and a shape. For example, a density of a dot included in the third dot area DA3 may be greater than a density of a dot included in the first dot area DA1. This is because a density of light from the light source increases as the second horizontal dot area HDA1b approaches an outer perimeter of the reflective sheet 126 folded along an imaginary horizontal bending line HBL.

Figure 23:
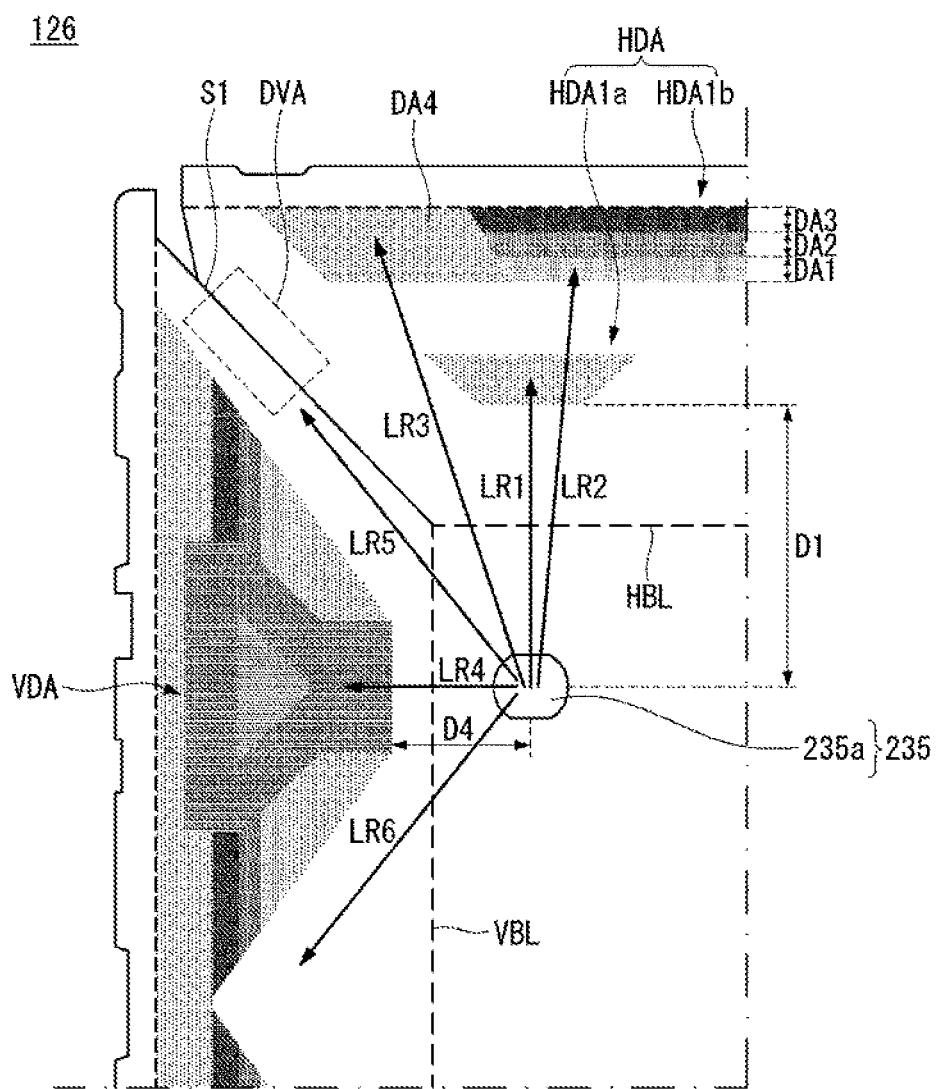

As shown in FIG. 23, the lens hole 235 disposed on the reflective sheet 126 may include a first lens hole 235a positioned at an edge of the reflective sheet 126. The first lens hole 235a may be related to all of the first and second horizontal dot areas HDA1a and HDA1b and the vertical dot area VDA.

A light source coupled to the first lens hole 235a may emit light around the light source. Light emitted from the light source may include first to sixth paths LR1 to LR6.

Light of the first path LR1 may be relatively dense light. Namely, the light of the first path LR1 may be light of a relatively bright area. The light of the first path LR1 may reach the first horizontal dot area HDA1a. The first horizontal dot area HDA1a may reduce a reflectance of dense light.

Light of the second path LR2 may be relatively dense light. The second horizontal dot area HDA1b may reduce a reflectance of the light of the second path LR2. The second horizontal dot area HDA1b may be divided into first to third dot areas DA1 to DA3 depending on a spectrum of an intensity of the light of the second path LR2.

Light of the third path LR3 may be sparser than the light of the second path LR2. Namely, because the third path LR3 is far away from the light source, an intensity of the light of the third path LR3 may be relatively reduced. Thus, a density of dots of a fourth dot area DA4 corresponding to the light of the third path LR3 may be different from a density of dots of the first to third dot areas DA1 to DA3. For example, a density of a dot included in the fourth dot area DA4 may be less than a density of dots included in the first to third dot areas DA1 to DA3.

Light of the fourth path LR4 may be relatively dense light. A starting position of the vertical dot area VDA may be spaced apart from the first lens hole 235a coupled to the light source by a fourth distance D4. The fourth distance D4 may be less than the first distance D1 as described above. The light of the fourth path LR4 may be relatively bright (or have relatively high brightness). Thus, dots included in a portion of the vertical dot area VDA corresponding to the fourth path LR4 may have a shape and/or an arrangement for controlling a reflection of light.

Light of the fifth and sixth paths LR5 and LR6 may have to travel a relatively long distance until reaching the reflective sheet 126. Thus, the light of the fifth and sixth paths LR5 and LR6 may be relatively sparse light. For example, because the light of the fifth path LR5 corresponds to an edge of the reflective sheet 126, the fifth path LR5 may have a relatively long length. An area corresponding to the fifth and sixth paths LR5 and LR6 may be the non-dot area NDA in which there is no dot.

Figure 24:
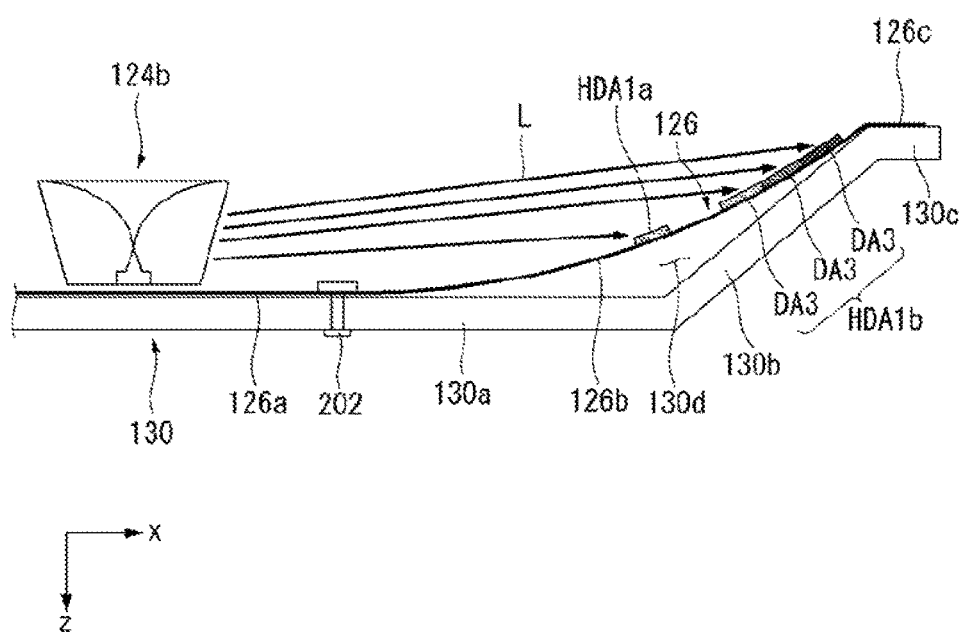

As shown in FIG. 24, light emitted from the light source may pass through the lens 124b. The lens 124b may change characteristic of light. For example, the lens 124b may change a path of light so that the light is not concentrated on a specific area. However, even if light passes through the lens 124b, a luminance of the light may not be uniform. Thus, the reflective sheet 126 according to the embodiment of the invention may partially adjust a reflectance of the reflective sheet 126 by forming the dots.

The first and second horizontal dot areas HDA1a and HDA1b may be positioned in the second sheet area 126b. The second sheet area 126b may be positioned between the first and third frame areas 130a and 130c and may be spaced apart from the frame 300. For example, the second sheet area 126b may have a naturally parabola shape by its own weight. Thus, as boundaries of the second sheet area 126b and the third sheet area 126c are close to each other, a slope of the second sheet area 126b may increase. As the slope of the second sheet area 126b increases, an intensity of light per unit area may increase. As the intensity of light per unit area increases, the second sheet area 126b may look relatively brighter than other areas.

The second horizontal dot area HDA1b may include first to third dot areas DA1 to DA3. The second dot area DA2 may include dots having a reflectance less than the first dot area DA1, and the third dot area DA3 may include dots having a reflectance less than the second dot area DA2. Namely, a reflectance of an area, that may look relatively bright, may be adjusted depending on a shape, a size, a disposition, etc. of the dot.

Figure 25:
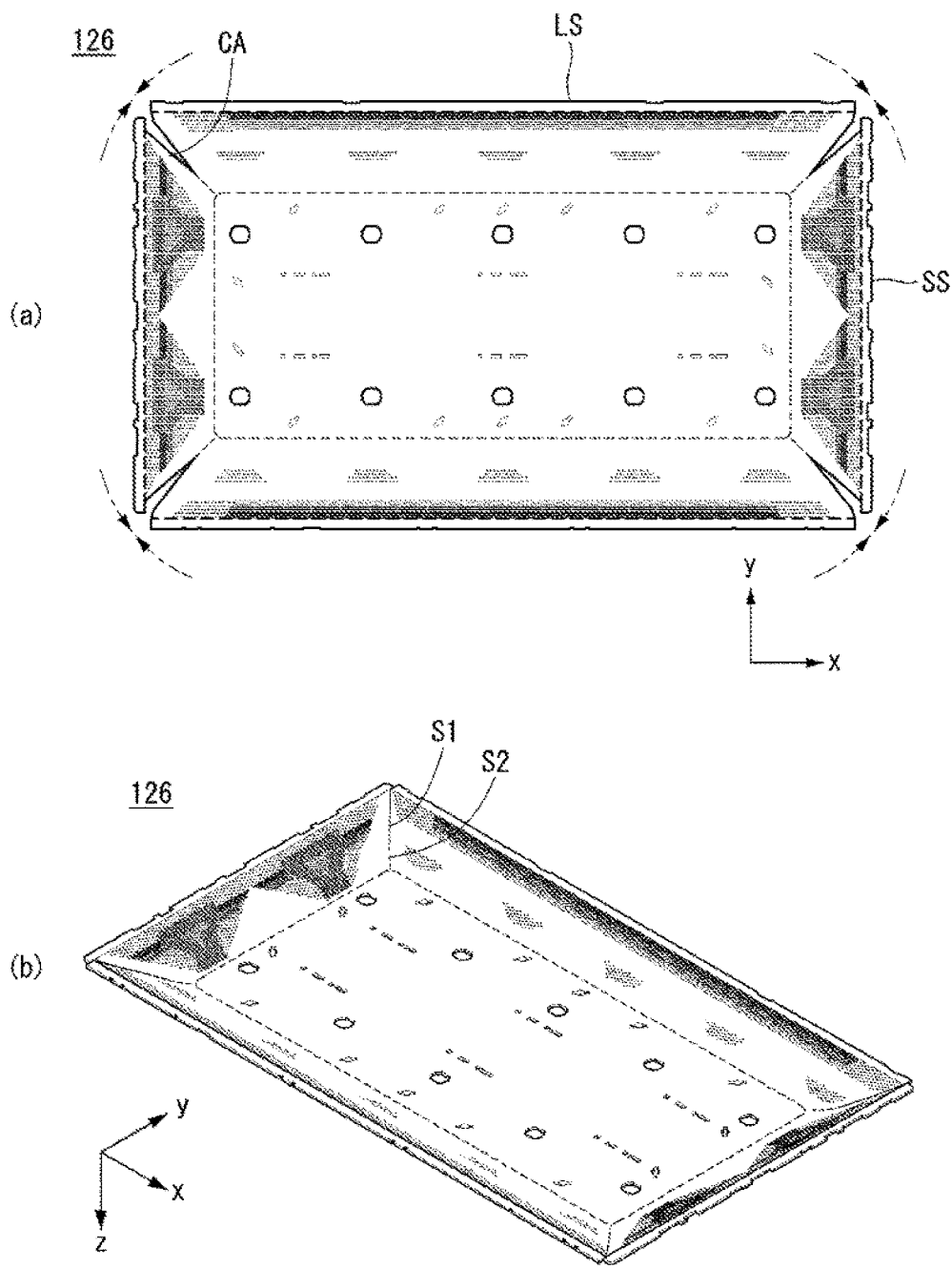
Figure 26:
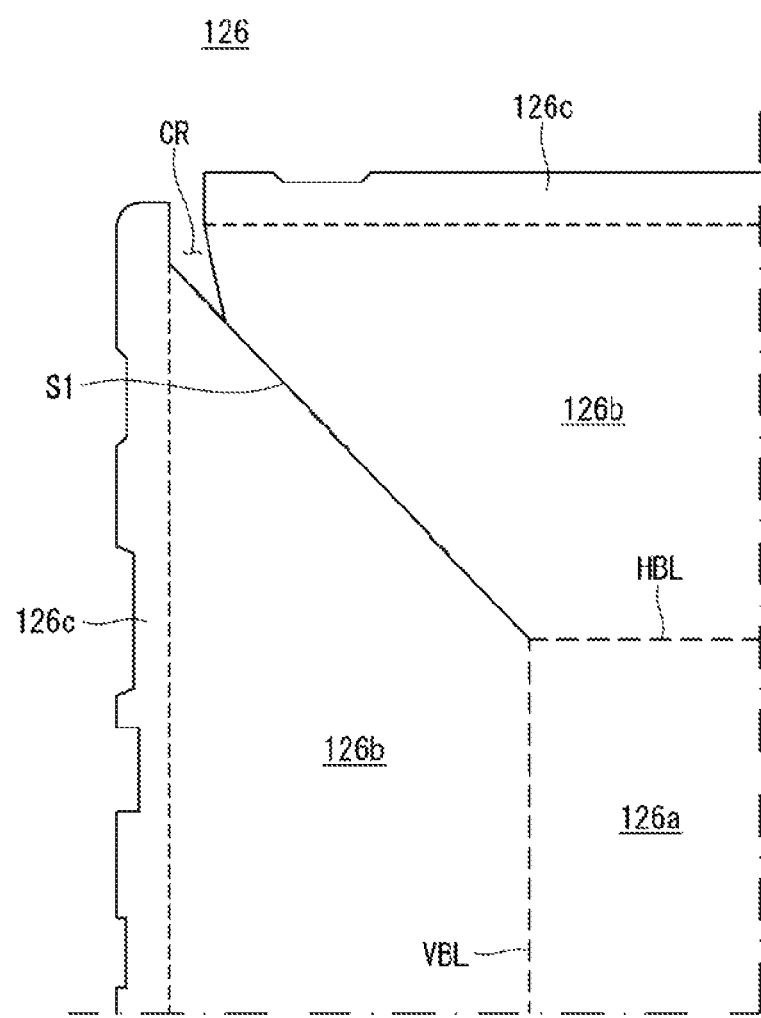

As shown in FIGS. 25 and 26, the reflective sheet 126 according to the embodiment of the invention may have cut surfaces CA. The cut surfaces CA may be used to naturally modify the planar reflective sheet 126 into a three-dimensional shape in accordance with the shape of the frame 130. Namely, the cut surfaces CA can prevent the reflective sheet 126 from being wrinkled.

As shown in (a) of FIG. 25, the reflective sheet 126 may have originally a two-dimensional shape. Namely, the reflective sheet 126 may be provided as a thin sheet. The thin sheet may be processed and modified into the shape of the reflective sheet 126. The reflective sheet 126 may have the cut surfaces CA.

The cut surface CA may have a triangular shape. For example, the triangular cut surface CA may be formed at each edge of the reflective sheet 126. Namely, the cut surface CA may be positioned between the long side LS and the short side SS of the reflective sheet 126. A folded portion S2 may be provided at an end of the cut surface CA.

The reflective sheet 126 having the cut surfaces CA may be folded in a direction, in which both sides of each cut surface CA approach each other. The reflective sheet 126 may be naturally folded by the folded portion S2.

As shown in (b) of FIG. 25, a cut portion S1 may be formed as both sides of the cut surface CA approach each other. The folded portion S2 may be formed subsequent to an end of the cut portion S1. The reflective sheet 126 may be naturally changed into the three-dimensional shape by the cut portion S1 and the folded portion S2. The cut portion S1 may be formed at a vertex of the reflective sheet 126 in a diagonal direction.

As shown in FIG. 26, when the reflective sheet 126 is placed on the frame 130, both sides of each cut surface CA may naturally approach each other. When both sides of each cut surface CA approach each other, the reflective sheet 126 may be naturally modified into the three-dimensional shape. Thus, a separate process for forming a chamfer may not be necessary. In other words, workability can be improved.

A gap CR may be a portion in which the reflective sheet 126 is not overlapped. When the reflective sheet 126 is overlapped around the cut portion S1, an uneven portion may be generated by an overlap portion. The gap CR can prevent or reduce the reflective sheet 126 from being overlapped.

Figure 27:
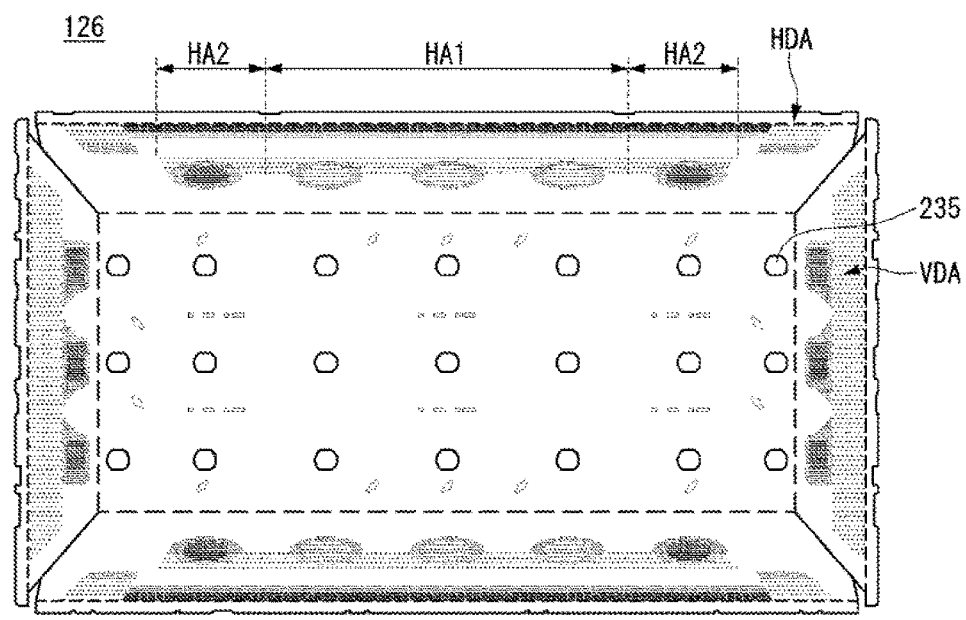

As shown in FIG. 27, the reflective sheet 126 according to the embodiment of the invention may include a horizontal dot area HDA and a vertical dot area VDA disposed corresponding to the lens holes 235 coupled to the light sources.

The horizontal dot area HDA may include a first area HA1 and a second area HA2. The first area HA1 may be a center area of the horizontal dot area HDA based on the long side of the reflective sheet 126, and the second area HA2 may be both end areas of the horizontal dot area HDA based on the long side of the reflective sheet 126. In other words, the second areas HA2 may be respectively positioned on both sides of the first area HA1.

Figure 28:
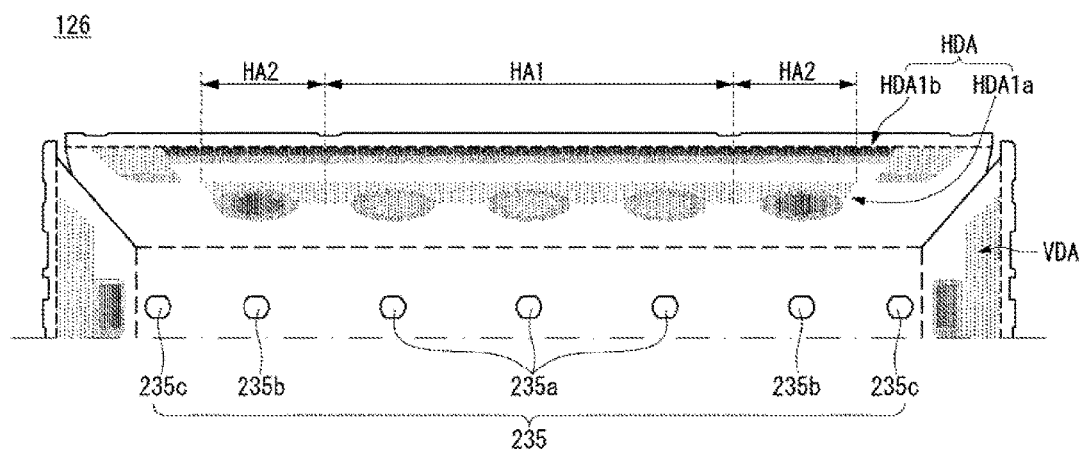

FIG. 28 illustrates in detail the horizontal dot area HDA.

As shown in FIG. 28, the horizontal dot area HDA may include first and second horizontal dot areas HDA1a and HDA1b that are spaced apart from each other.

A dot of the first area HA1 in the first horizontal dot area HDA1a may have an attribute different from a dot of the second area HA2 in the first horizontal dot area HDA1a. For example, in the first horizontal dot area HDA1a, a density of the dot of the first area HA1 may be greater than a density of the dot of the second area HA2.

The first area HA1 may correspond to first light sources 235a, and the second area HA2 may correspond to second light sources 235b. Dots may be disposed in the first area HA1 so that a reflectance of the first area HA1 which may be affected by the adjacent light sources, is greater than a reflectance of the second area HA2.

The first horizontal dot area HDA1a may not correspond to a third lens hole 235c. Namely, the first horizontal dot area HDA1a corresponding to the third lens hole 235c may be absent on the long side of the reflective sheet 126. Because the third lens hole 235c is coupled to the light source positioned at an outermost location of the long side of the reflective sheet 126, the third lens hole 235c may be relatively far away from an edge of the reflective sheet 126. Thus, because the reflective sheet 126 may be relatively less affected by light of the light source coupled to the third lens hole 235c, the first horizontal dot area HDA1a corresponding to the third lens hole 235c may be omitted.

Figure 29:
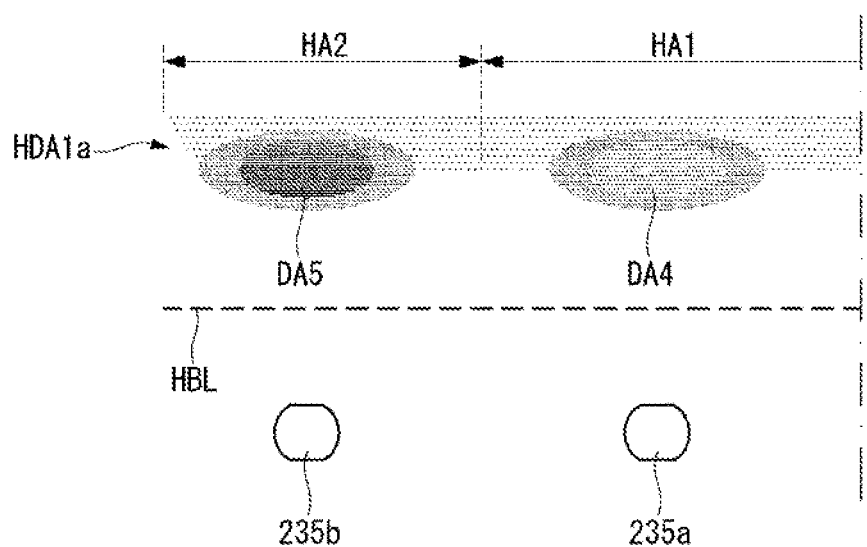

As shown in FIG. 29, an attribute of dots of a fourth dot area DA4 included in the first area HA1 may be different from an attribute of dots of a fifth dot area DA5 included in the second area HA2. For example, at least one of a size, a density, a color, and a shape of a dot included in the fifth dot area DA5 may be different from at least one of a size, a density, a color, and a shape of a dot included in the fourth dot area DA4. For example, a density of a dot included in the fifth dot area DA5 may be greater than a density of a dot included in the fourth dot area DA4.

Figure 30:
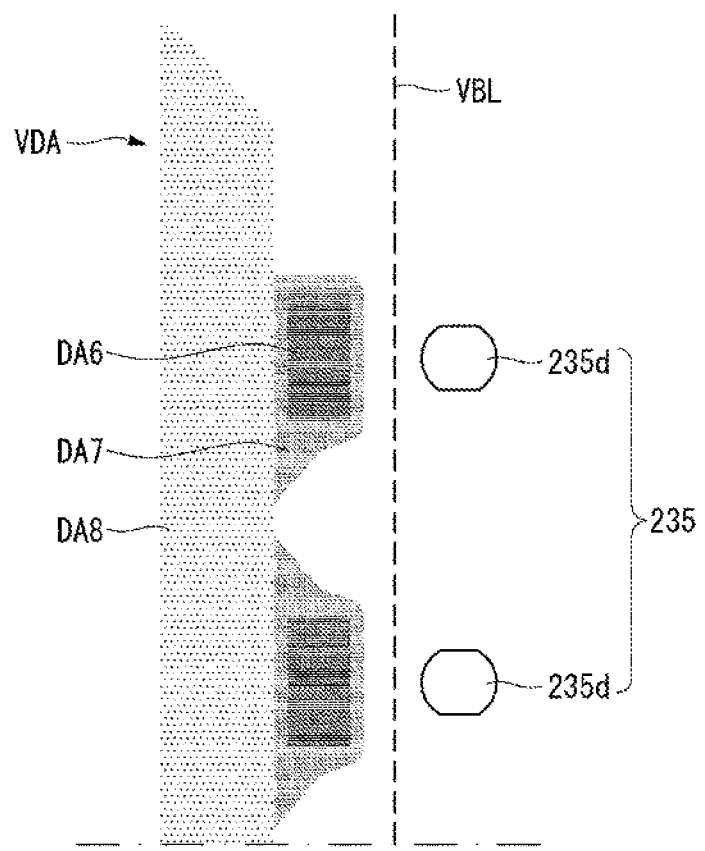

FIG. 30 illustrates in detail the vertical dot area VDA.

As shown in FIG. 30, a distribution of dots included in the vertical dot area VDA may vary depending on a location of the lens hole 235 corresponding to the vertical dot area VDA. For example, a portion of the vertical dot area VDA adjacent to a fourth lens hole 235d may protrude toward the fourth lens hole 235d.

A protrusion of the vertical dot area VDA may include a sixth dot area DA6 and a seventh dot area DA7. A reflectance of dots included in the sixth and seventh dot areas DA6 and DA7 may be less than a reflectance of dots included in an eighth dot area DA8. For example, a density of a dot included in the sixth and seventh dot areas DA6 and DA7 may be greater than a density of a dot included in the eighth dot area DA8, and a density of a dot included in the sixth dot area DA6 may be greater than a density of a dot included in the seventh dot area DA7. Namely, dots may be distributed in an arrangement capable of minimizing a reflectance of the seventh dot area DA7 that is most affected by light of the light source coupled to the fourth lens hole 235d.

Figure 31:
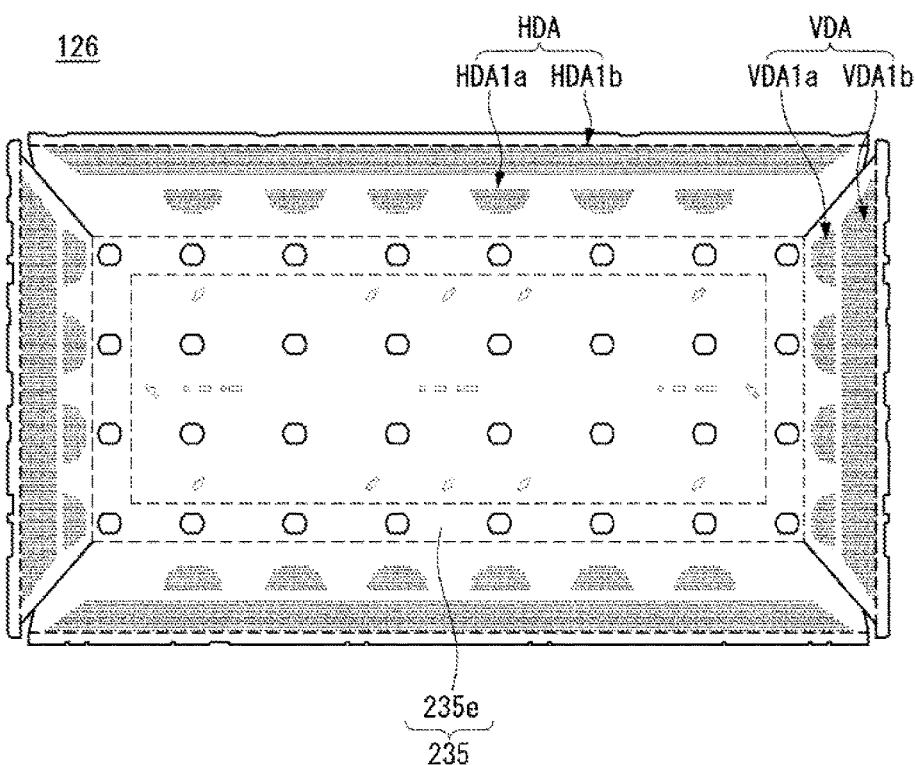

FIG. 31 illustrates the reflective sheet 126 according to the embodiment of the invention.

As shown in FIG. 31, a horizontal dot area HDA and a vertical dot area VDA may be disposed. The horizontal dot area HDA may include a first horizontal dot area HDA1a and a second horizontal dot area HDA1b that are spaced apart from each other. The vertical dot area VDA may include a first vertical dot area VDA1a and a second vertical dot area VDA1b that are spaced apart from each other.

The first horizontal dot area HDA1a and the first vertical dot area VDA1a may correspond to the lens holes 235. In other words, the first horizontal dot area HDA1a and the first vertical dot area VDA1a may be disposed corresponding to fifth lens holes 235e positioned at an outermost location among the lens holes 235. Such a disposition of the first horizontal and vertical dot areas HDA1a and VDA1a can prevent the first horizontal and vertical dot areas HDA1a and VDA1a from looking brighter than other areas by light emitted from the fifth lens holes 235e.

Figure 32:
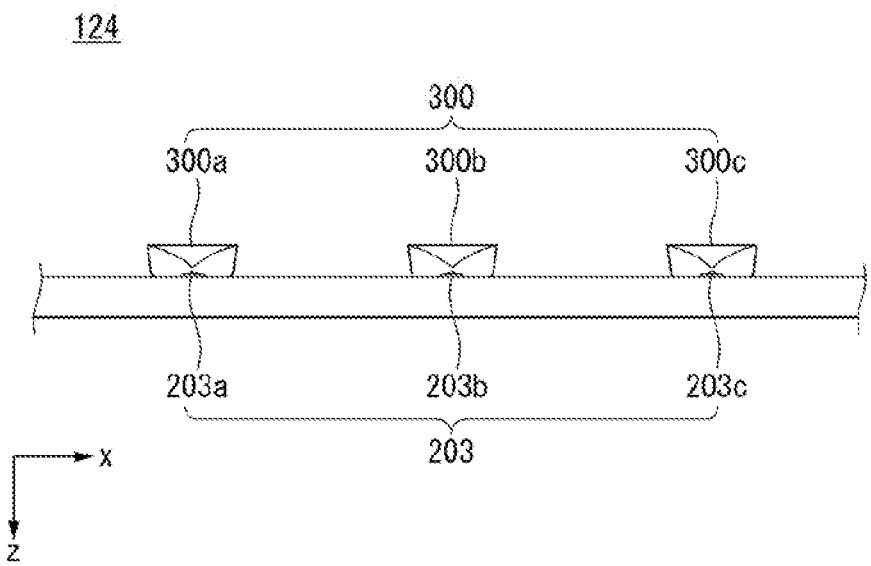
FIG. 32 illustrates a light assembly including a light source shown in FIG. 10.

FIG. 32 illustrates a light assembly including a light source shown in FIG. 10.

As shown in FIG. 32, a plurality of light assemblies 124 according to the embodiment of the invention may be disposed along the substrate 122 and spaced apart from one another. Each light assembly 124 may include a light source 203 and a lens 300 positioned on one side of the light source 203.

The light source 203 may be various sources emitting light. For example, the light source 203 may be a COB type LED as described above.

The lens 300 may be positioned on the light source 203. At least a portion of the light source 203 may overlap the lens 300. For example, the light source 203 may be inserted into a groove inside the lens 300. Alternatively, an area of the light source 203, from which light is substantially emitted, may be inserted into a lower side of the lens 300. For example, when the lens 300 has a leg structure, a portion of an upper side of the light source 203 may be inserted into the lower side of the lens 300.

The lens 300 may reflect a portion of light emitted from the light source 203 and may refract a portion of the light. For example, the lens 300 may be a refractive lens or a reflective lens. The light emitted from the light source 203 may be uniformly and entirely spread through the reflection in a portion of the lens 300 and/or the refraction in a portion of the lens 300.

The light source 203 inserted into the lens 300 may be adhered to the lens 300. For example, the lens 300 and the light source 203 may be attached to each other using an adhesive.

The lens 300 may correspond to each light source 203. For example, first to third lenses 300a to 300c may be respectively positioned on first to third light sources 203a to 203c.

The lens 300 may control a path of light emitted from the light source 203. Namely, the lens 300 may control the light source 203 so that the light of the light source 203 is not concentrated on a specific location. In other words, the lens 300 may cause the light of the light source 203 to be uniformly diffused. The lens 300 according to the embodiment of the invention may efficiently control the path of the light of the light source 203. The lens 300 according to the embodiment of the invention may efficiently control light emitted from the side of the light source 203.

Figure 33:
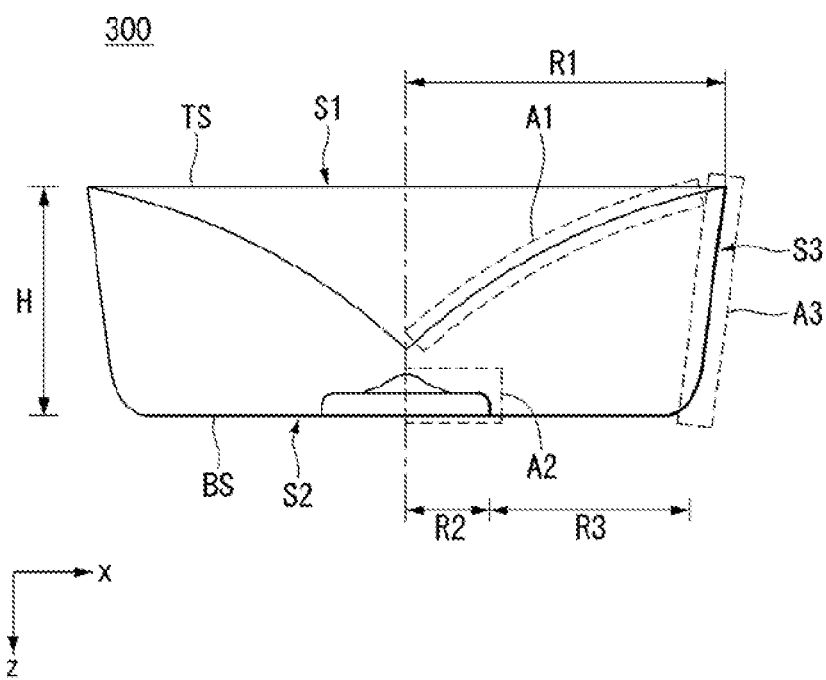
FIGS. 33 and 34 illustrate a lens according to an embodiment of the invention.
Figure 34:
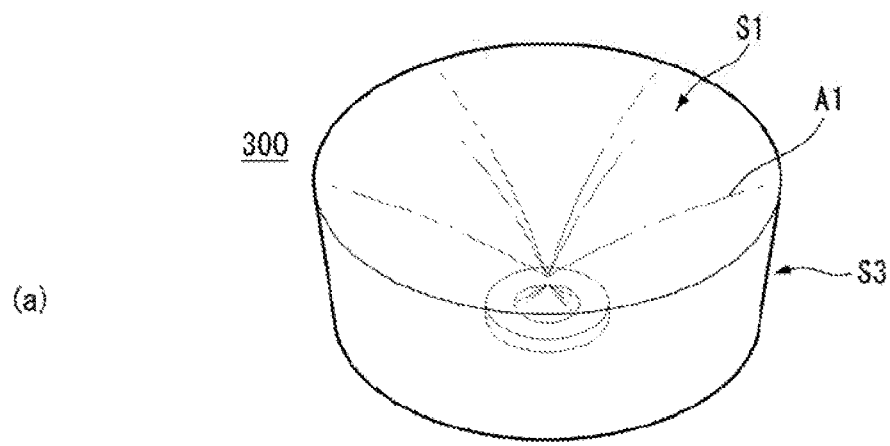
Figure 34:
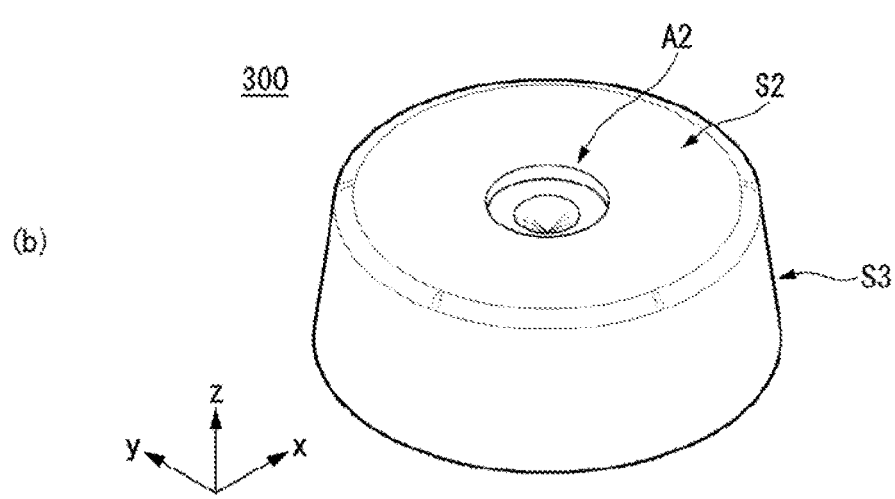

FIGS. 33 and 34 illustrate a lens according to the embodiment of the invention.

As shown in FIGS. 33 and 34, a lens 300 according to the embodiment of the invention may have a specific shape.

The lens 300 may include a first surface S1, a second surface S2 opposite the first surface S1, and a third surface S3 connecting the first surface S1 and the second surface S2.

The first surface S1 may be an upper surface of the lens 300. At least a portion of the first surface S1 of the lens 300 according to the embodiment of the invention may be recessed (or a recess). The recess of the first surface S1 may have a shape curved from the center of the lens 300 toward the outside of the lens 300. For example, a first concave portion A1 may be formed on the first surface S1.

An uppermost portion of the first surface S1 may be a top surface TS. The first surface S1 may have a circular cross-sectional shape. Light emitted from the upper side of the light source 203 may be upwardly emitted through the first surface S1 of the lens 300.

The second surface S2 may be a lower surface of the lens 300. Namely, the second surface S2 may be a surface opposite the first surface S1 corresponding to the upper surface of the lens 300. At least a portion of the second surface S2 of the lens 300 according to the embodiment of the invention may be recessed (or a recess). For example, a second concave portion A2 may be formed on the second surface S2.

A radius of the second concave portion A2 on the second surface S2 may be denoted as R2. The radius R2 of the second concave portion A2 may be 1.5 to 4 times a radius of the light source 203 coupled to the lens 300.

A lowermost portion of the second surface S2 may be a bottom surface BS. The second surface S2 may have a circular cross-sectional shape. The light source 203 may be coupled to the second surface S2. As described above, a portion of the light source 203 may be inserted into the second surface S2.

A radius of the second surface S2 may be "R2+R3". A radius R1 of the first surface S1 may be 1 to 3 times the radius (R2+R3) of the second surface S2. Namely, a width of the top surface TS may be greater than a width of the bottom surface BS.

The radius (R2+R3) of the second surface S2 may be 2 to 4 times a radius R2 of the second concave portion A2.

The third surface S3 may be a surface connecting the first surface S1 and the second surface S2. Namely, the third surface S3 may be a side surface connecting the upper surface and the lower surface of the lens 300. The first surface S1 and the second surface S2 each have the circular cross section, and the third surface S3 forms an outer surface connecting the first surface S1 and the second surface S2. Therefore, the lens 300 may have an outline of a cylindrical shape having a height H. In the cylindrical shape of the lens 300, at least a portion of the first to third surfaces S1 to S3 may be changed.

Figure 35:
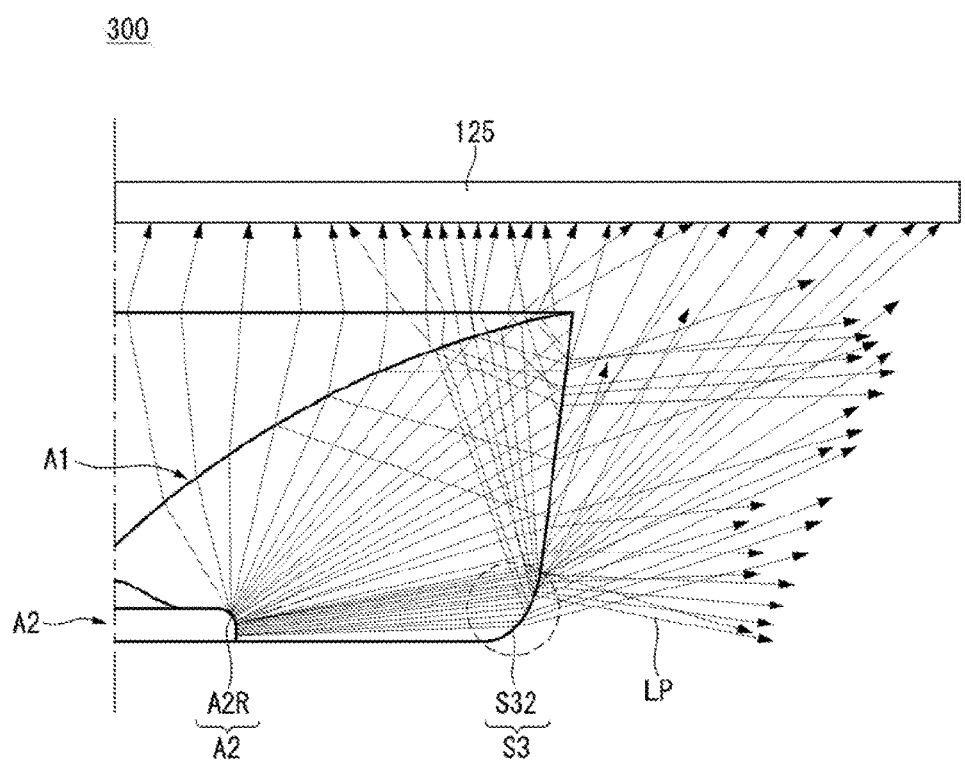
FIG. 35 illustrates an example of a light path of a lens shown in FIG. 32.

FIG. 35 illustrates an example of a light path of a lens shown in FIG. 33.

As shown in FIG. 35, the lens 300 according to the embodiment of the invention may control a path LP of light and may allow the light to be uniformly transferred to the optical sheet 125. In particular, the lens 300 according to the embodiment of the invention may change the path LP of light emitted from the side of the light source 203.

The light emitted from the side of the light source 203 may be firstly diffused from the second concave portion A2. Namely, as described above, the light path LP may be radiated due to a shape of a third area A2R of the second concave portion A2.

The light path LP distributed from the side of the second concave portion A2 may be again radiated via a curved surface S32 of the third surface S3.

At least a portion of the light path LP passing through the second concave portion A2, etc., may be refracted and/or reflected from the first concave portion A1. Thus, the light path LP may be prevented from being concentrated on a specific location. As a result, light may be uniformly distributed on the optical sheet 125.

FIGS. 36 to 41 illustrate a lens according to another embodiment of the invention.

As shown in FIGS. 36 to 41, the lens 300 according to the embodiment of the invention may be variously configured.

Figure 36:
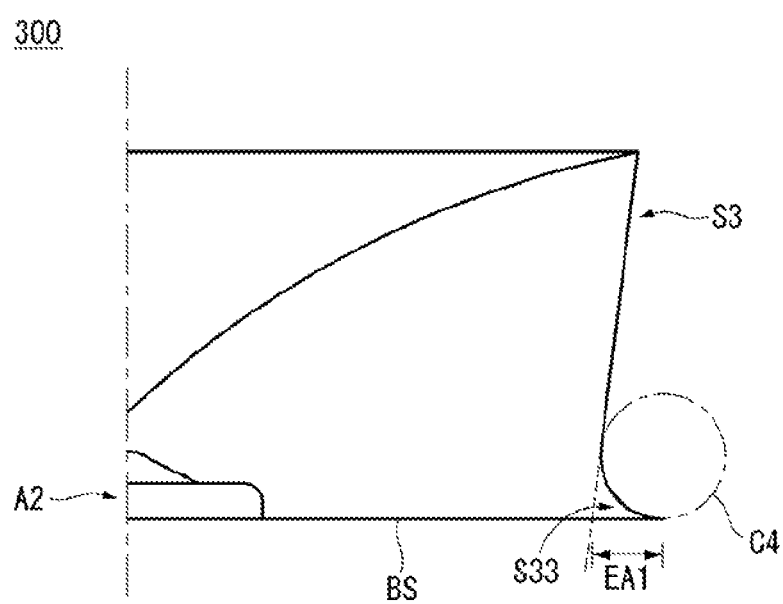
FIGS. 36 to 41 illustrate a lens according to another embodiment of the invention.

As shown in FIG. 36, a curved surface S33 of the third surface S3 may have a shape protruding toward the outside of the lens 300. For example, the curved surface S33 may form a curved surface S32 corresponding to an imaginary fourth circle C4 adjoining an external surface of the third surface S3. The curved surface S33 may have the shape extended from the second surface S2 by a distance EA1.

Figure 37:
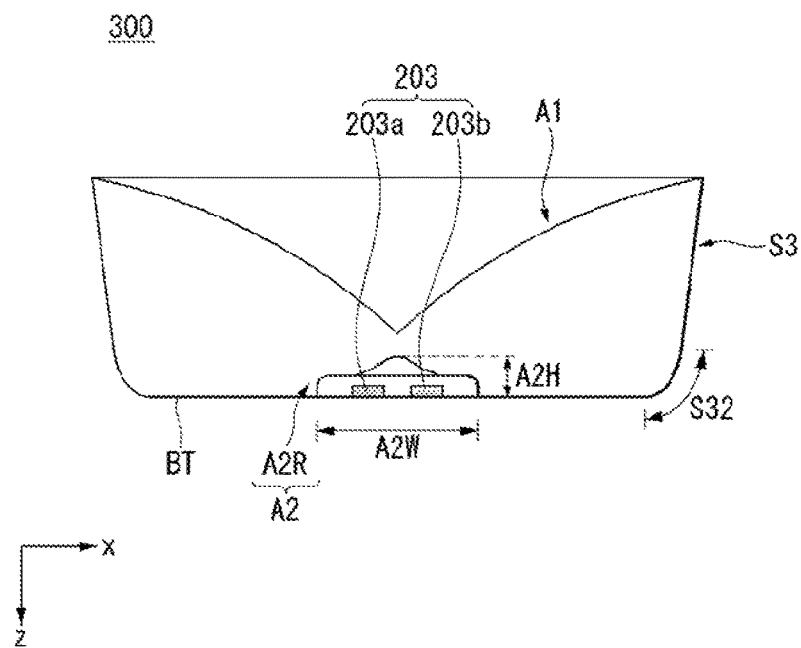

As shown in FIG. 37, the plurality of light sources 203 may correspond to one lens 300. For example, first and second light sources 203a and 203b may be positioned inside the second concave portion A2.

The light source 203 may have the relatively small size. The light source 203 may have a performance of high power. Thus, the first and second light sources 203a and 203b may correspond to one lens 300.

The second concave portion A2 may have an oval shape. For example, the second concave portion A2 may have a shape, in which a width A2W of the second concave portion A2 is greater than a height A2H of the second concave portion A2. The plurality of light sources 203a and 203b may be positioned in a space obtained by configuring the second concave portion A2 in the oval shape.

When the plurality of light sources 203 are positioned inside the second concave portion A2, the shape of the second concave portion A2 and/or the curved surface S32 of the third surface S3 may perform an important function in the embodiment of the invention. Namely, because a large amount of light may be generated from the sides of the first and second light sources 203a and 203b, it is necessary to more efficiently control the light emitted from the sides of the first and second light sources 203a and 203b. The embodiment of the invention may efficiently distribute the light emitted from the sides of the light sources through the curved third area A2R on the side of the second concave portion A2 and/or the curved surface S32 on the lower side of the third surface S3.

Figure 38:
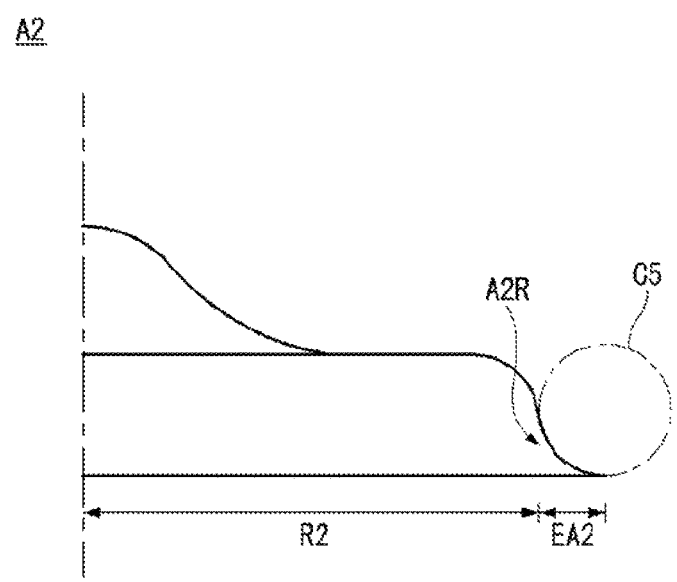

As shown in FIG. 38, the third area A2R of the second concave portion A2 may have a shape of a curved surface protruding to the outside of the lens 300. For example, the third area A2R may have a shape of a curved surface corresponding to an imaginary fifth circle C5 adjoining the third area A2R of the second concave portion A2 outside the second concave portion A2. In this instance, a length of the second concave portion A2 may be extended by a distance EA2.

As shown in FIGS. 34 to 39, the embodiment of the invention may be applied to the lens 300, which may be configured in various shapes.

Figure 39:
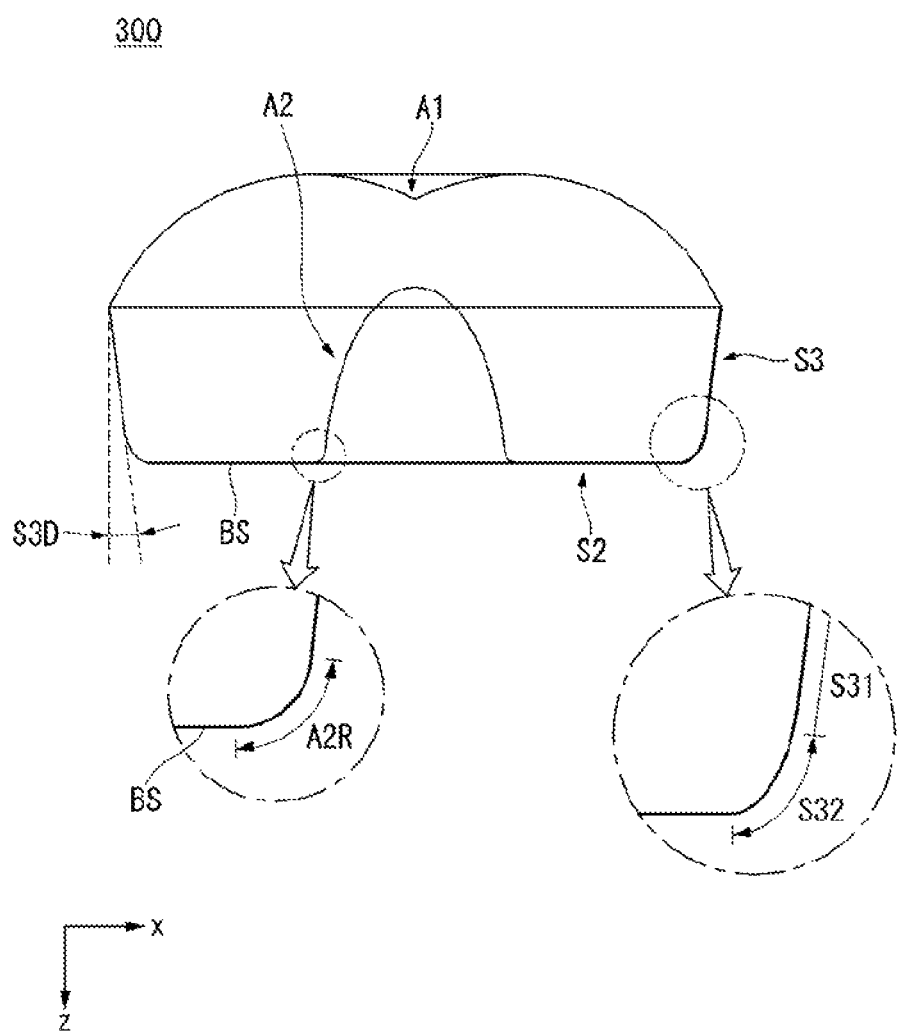

As shown in FIG. 39, the third surface S3 may have a shape inclined at a predetermined angle. For example, the third surface S3 may have a shape inclined to the inside by an angle S3D from the vertical line.

The third surface S3 may include a straight surface S31 and a curved surface S32. The curved surface S32 may be connected to the second surface S2.

The third area A2R may be formed on the second concave portion A2. Namely, a curved surface may be formed in an area extended from the lower side of the second concave portion A2 to the bottom surface BS. The light emitted from the light source may be distributed due to the third area A2R. In particular, the third area A2R may improve the uniformity of the light emitted from the side of the light source.

Figure 40:
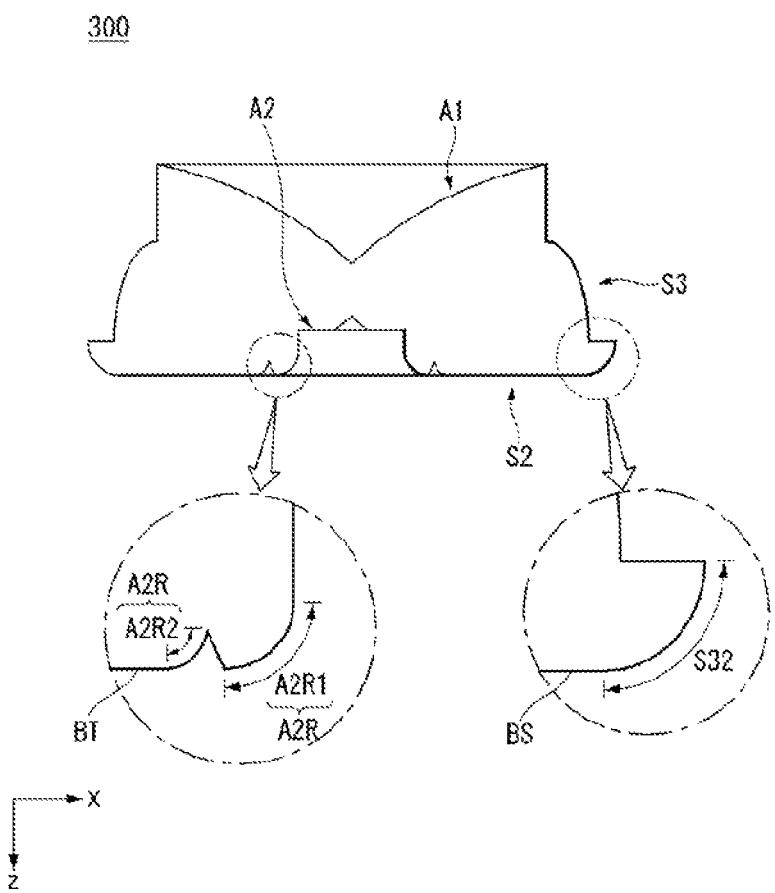

As shown in FIG. 40, a predetermined curved surface S32 may be formed in an area where the third surface S3 of the lens 300 and the bottom surface BS meet.

Third areas A2R1 and A2R2 may be formed on the second concave portion A2. Namely, a curved surface may be formed in a portion of an area where the second concave portion A2 and the bottom surface BS meet. The third areas A2R1 and A2R2 may include a 3a area A2R1 and a 3b area A2R2. Namely, a plurality of curved surfaces may be formed in a plurality of areas where the second concave portion A2 and the bottom surface BS meet.

Figure 41:
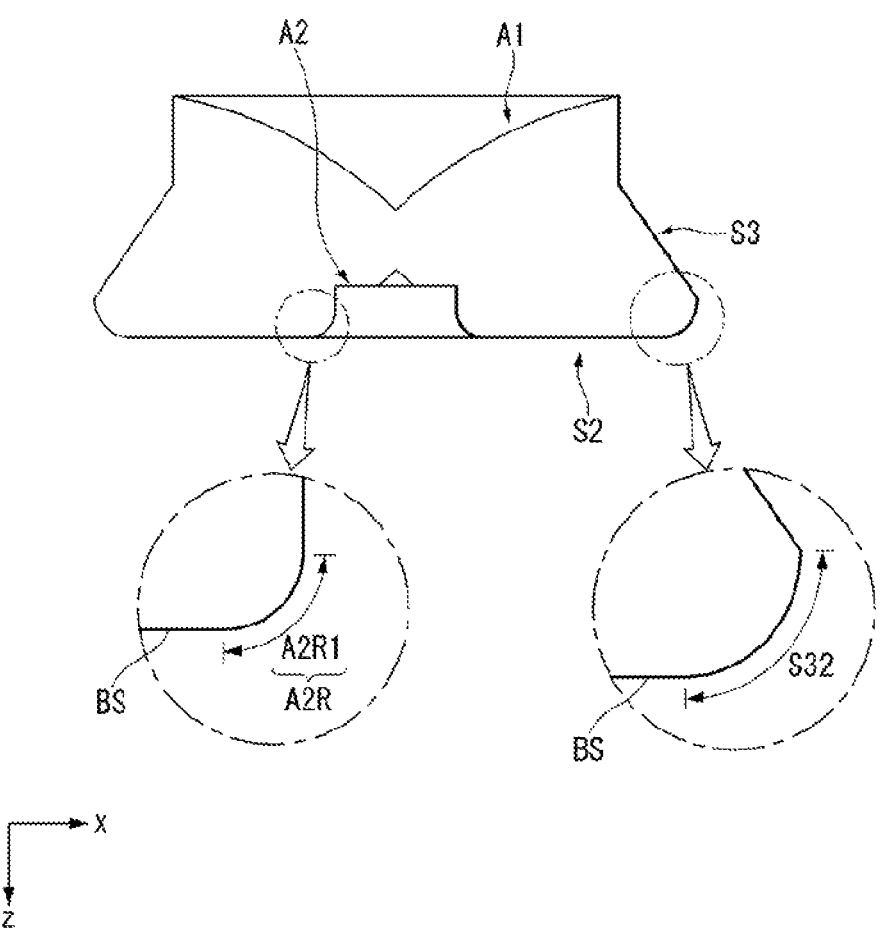

As shown in FIG. 41, a curved surface S32 may be formed in an area where the third surface S3 of the lens 300 and the bottom surface BS meet. The third area A2R of the curved surface may be formed on the second concave portion A2.

Figure 42:
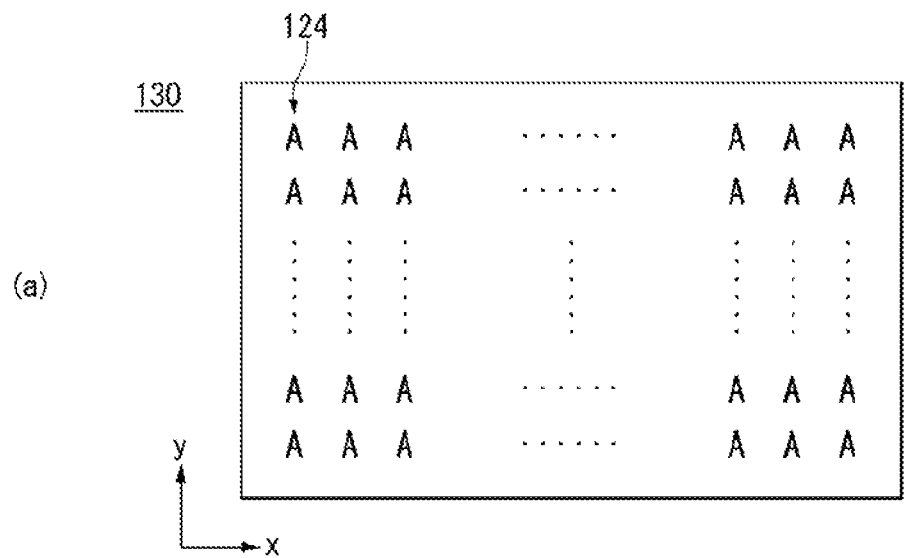
FIGS. 42 and 43 illustrate a disposition of a light assembly according to another embodiment of the invention.
Figure 42:
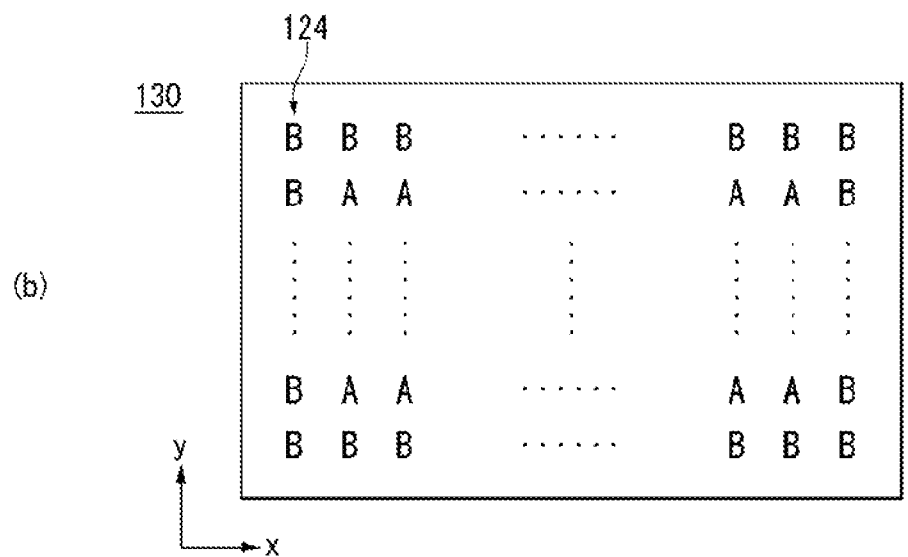
Figure 43:
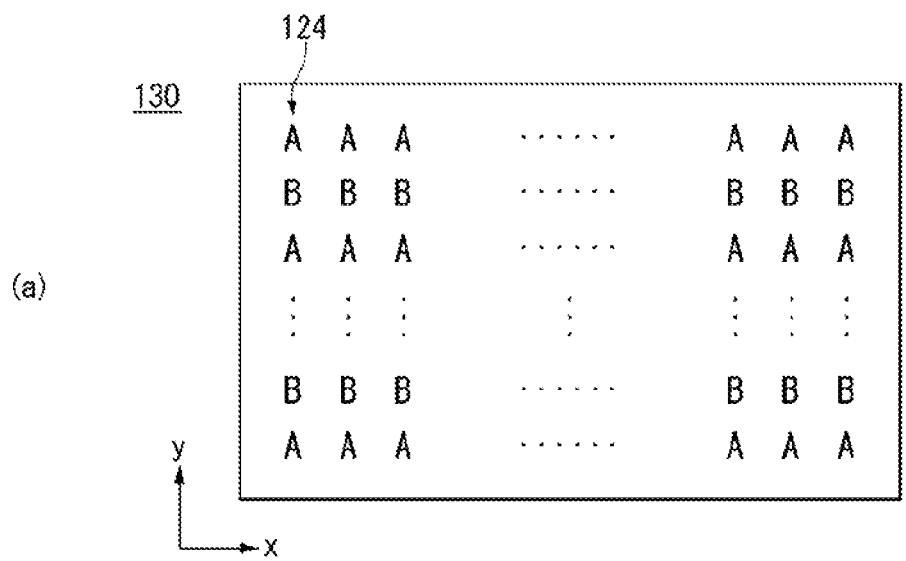
Figure 43:
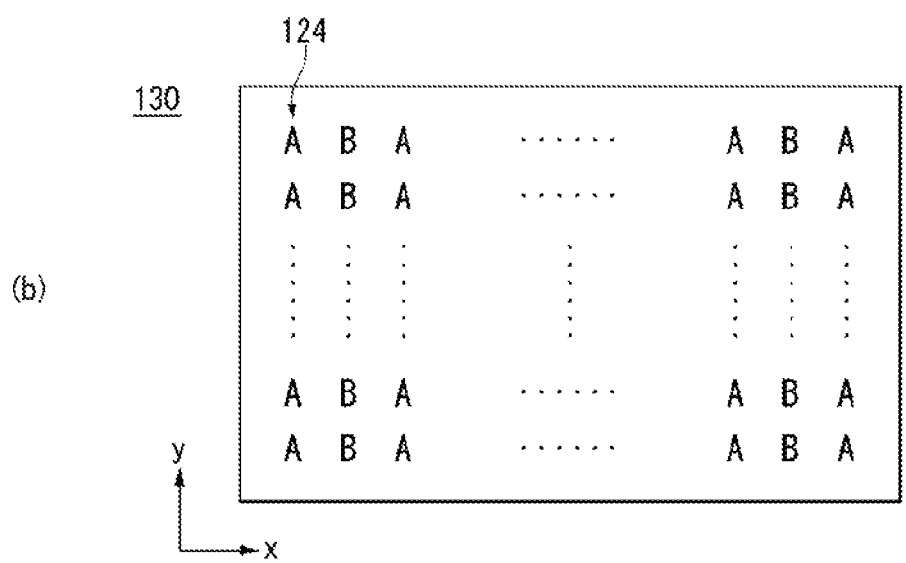

FIGS. 42 and 43 illustrate a disposition of a light assembly according to another embodiment of the invention.

As shown in FIGS. 42 and 43, the light assembly 124 may be positioned on the frame 130. The light assembly 124 may be configured in various shapes depending on a location. The light assembly 124 may include at least one of the lenses 300 having the above-described shapes. Thus, a contrast or a hot spot resulting from the lens 300 may be prevented from being generated.

As shown in (a) of FIG. 42, the light assembly 124 may be positioned on the frame 130. In FIGS. 42 and 43, alphabets "A" and "B" indicate the light assembly 124. Namely, the light assemblies 124 may be arranged in the horizontal and vertical directions.

The light assemblies 124 shown in (a) of FIG. 42 may the A-type light assemblies 124. For example, the light assembly 124 including the lens 300 of a specific shape may be positioned.

As shown in (b) of FIG. 42, the A-type light assemblies 124 and the B-type light assemblies 124 may be arranged. For example, the light assemblies 124 including two types of lenses 300 may be arranged. In this instance, the B-type light assemblies 124 may be arranged on the outermost side of an array of the light assemblies 124, and the A-type light assemblies 124 may be arranged in an inner area of the array.

The light assemblies 124 different from the light assemblies 124 arranged in the inner area of the array may be arranged on the outermost side of the array. Thus, the light assembly 124 positioned on the outermost side of the array may include the lens 300 different from the light assembly 124 positioned in the inner area of the array, so as to uniformly distribute light.

As shown in (a) and (b) of FIG. 43, at least two types of light assemblies 124 may be alternately arranged. For example, the light assemblies 124 each including the A-type lens 300 and the light assemblies 124 each including the B-type lens 300 may be alternately arranged in the horizontal direction or the vertical direction.

The embodiments and/or the configurations of the invention may be combined with each other. For example, a configuration "A" described in one embodiment of the invention and the drawings and a configuration "B" described in another embodiment of the invention and the drawings may be combined with each other. Namely, although the combination between the configurations is not directly described, the combination is possible except in the instance where it is described that the combination is impossible. This is certain considering that the embodiment of the invention relates to the display device.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a frame including a bottom area and a sidewall area extended from the bottom area;
   at least one substrate positioned at a front surface of the frame, a plurality of light sources being mounted on the at least one substrate;
   a reflective sheet positioned at a front surface of the at least one substrate; and
   an optical sheet positioned at a front surface of the reflective sheet,
   wherein the reflective sheet includes a first sheet area contacting the bottom area of the frame and including a plurality of lens holes, and a second sheet area connected to the first sheet area and extending along the bottom area and the sidewall, the second sheet area including a dot area,
   wherein the dot area includes a first dot area and a second dot area spaced apart from the first dot area,
   wherein the second dot area is disposed along a side of the reflective sheet, and
   wherein the first dot area is disposed between the second dot area and the plurality of lens holes.

2. The backlight unit of claim 1, wherein the first dot area is disposed corresponding to an outermost lens hole of the plurality of lens holes.

3. The backlight unit of claim 1, wherein the dot area includes a horizontal dot area disposed along a long side of the reflective sheet and a vertical dot area disposed along a short side of the reflective sheet, and
   wherein an outermost lens hole of the plurality of lens holes is disposed closer to the vertical dot area than the horizontal dot area.

4. The backlight unit of claim 3, wherein the horizontal dot area includes the first dot area and the second dot area.

5. The backlight unit of claim 3, wherein the reflective sheet further includes at least one of a cut portion between the horizontal dot area and the vertical dot area and a folded portion extended from the cut portion.

6. The backlight unit of claim 1, wherein the first dot area includes a plurality of first dot areas corresponding to a plurality of outermost lens holes of the plurality of lens holes, and
   wherein an attribute of a dot included in at least one of the plurality of first dot areas is different from an attribute of a dot included in at least another of the plurality of first dot areas.

7. The backlight unit of claim 1, wherein the second dot area includes a plurality of areas, and a density of dots included in the plurality of areas of the second dot area increases as a distance between the lens hole and the second dot area increases.

8. The backlight unit of claim 1, wherein a plurality of dots constituting the dot area is an uneven portion formed in at least a portion of the reflective sheet.

9. The backlight unit of claim 1, wherein a size of at least one of a plurality of dots constituting the dot area is different from a size of at least another of the plurality of dots.

10. The backlight unit of claim 1, wherein a first distance between two dots of a plurality of dots constituting the dot area is different from a second distance between two other dots of the plurality of dots.

11. The backlight unit of claim 1, wherein the second sheet area is present between the bottom area and the sidewall area of the frame, and
    wherein as the second sheet area becomes close to the sidewall area from the bottom area, an angle between the second sheet area and the bottom area of the frame increases.

12. The backlight unit of claim 11, wherein the reflective sheet further includes a third sheet area extended from the second sheet area and contacting the sidewall area of the frame.

13. The backlight unit of claim 12, further comprising at least one guide panel coupled to the sidewall area of the frame,
    wherein the third sheet area is positioned between the frame and the at least one guide panel.

14. A display device comprising:
    a frame including a bottom area and a sidewall area extended from the bottom area;
    at least one substrate on which a plurality of light sources is mounted;
    a reflective sheet positioned at a front surface of the at least one substrate;
    an optical sheet positioned at a front surface of the reflective sheet; and
    a display panel positioned at a front surface of the optical sheet,
    wherein the reflective sheet includes a first sheet area contacting the bottom area of the frame and including a plurality of lens holes, and a second sheet area spaced apart from the bottom area of the frame and including a dot area, wherein the dot area includes a first dot area and a second dot area spaced apart from the first dot area, wherein the second dot area is disposed along a side of the reflective sheet, and wherein the first dot area is disposed between the second dot area and the plurality of lens holes.

15. The display device of claim 14, wherein the first dot area is disposed corresponding to an outermost lens hole of the plurality of lens holes.

16. The display device of claim 14, wherein the dot area includes a horizontal dot area disposed along a long side of the reflective sheet and a vertical dot area disposed along a short side of the reflective sheet, and wherein an outermost lens hole of the plurality of lens holes is disposed closer to the vertical dot area than the horizontal dot area.

17. The display device of claim 14, wherein the first dot area includes a plurality of first dot areas corresponding to a plurality of outermost lens holes of the plurality of lens holes, and wherein an attribute of a dot included in at least one of the plurality of first dot areas is different from an attribute of a dot included in at least another of the plurality of first dot areas.

* * * * *